(12) United States Patent
Vacon et al.

(10) Patent No.: US 11,367,014 B2
(45) Date of Patent: Jun. 21, 2022

(54) SYSTEM AND METHOD FOR QUANTUM CACHE

(71) Applicant: Qubit Moving and Storage, LLC, Franconia, NH (US)

(72) Inventors: Gary Vacon, East Falmouth, MA (US); Kristin A. Rauschenbach, Franconia, NH (US)

(73) Assignee: Qubit Moving and Storage, LLC, Franconia, NH (US)

( * ) Notice: Subject to any disclaimer, the term of this patent is extended or adjusted under 35 U.S.C. 154(b) by 0 days.

(21) Appl. No.: 17/306,850

(22) Filed: May 3, 2021

(65) Prior Publication Data
US 2022/0114471 A1 Apr. 14, 2022

Related U.S. Application Data

(60) Provisional application No. 63/183,021, filed on May 2, 2021, provisional application No. 63/020,221, filed on May 5, 2020.

(51) Int. Cl.
*G06F 12/122* (2016.01)
*G06N 10/20* (2022.01)

(52) U.S. Cl.
CPC .......... *G06N 10/20* (2022.01); *G06F 12/122* (2013.01); *G06F 2212/1004* (2013.01)

(58) Field of Classification Search
CPC ...... G06N 10/20; G06N 10/40; G06F 12/122; G06F 2212/1004
See application file for complete search history.

(56) References Cited

U.S. PATENT DOCUMENTS

| 7,028,275 B1 * | 4/2006 | Chen ..................... G06N 10/00 703/2 |
| 2008/0059712 A1 | 3/2008 | Fedorova |

(Continued)

FOREIGN PATENT DOCUMENTS

WO  WO-2020180672 A1 *  9/2020  ............. B82Y 10/00

OTHER PUBLICATIONS

Meyer-Scott, et al., "Single-photon sources: Approaching the ideal through multiplexing", Review of Scientific Instruments, vol. 91, 041101, 2020, 19 pages.

(Continued)

*Primary Examiner* — Andrew J Cheong
(74) *Attorney, Agent, or Firm* — Rauschenbach Patent Law Group, LLC; Kurt Rauschenbach

(57) ABSTRACT

An entangled quantum cache includes a quantum store that receives a plurality of quantum states and is configured to store and order the plurality of quantum states and to provide select ones of the stored and ordered plurality of quantum states to a quantum data output at a first desired time. A fidelity system is configured to determine a fidelity of at least some of the plurality of quantum states. A classical store is coupled to the fidelity system and configured to store classical data comprising the determined fidelity information and an index that associates particular ones of classical data with particular ones of the plurality of quantum states and to supply at least some of the classical data to a classical data output at a second desired time. A processor is connected to the classical store and determines the first time based on the index.

44 Claims, 14 Drawing Sheets

(56) References Cited

U.S. PATENT DOCUMENTS

| | | | |
|---|---|---|---|
| 2017/0364796 A1 | 12/2017 | Wiebe et al. | |
| 2018/0232649 A1 | 8/2018 | Wiebe et al. | |
| 2020/0382219 A1* | 12/2020 | Innes | H04B 10/70 |
| 2021/0124640 A1* | 4/2021 | Nickerson | G06N 10/00 |
| 2021/0132969 A1* | 5/2021 | Smith | G06N 10/00 |
| 2021/0296558 A1* | 9/2021 | Englund | H01L 41/09 |

OTHER PUBLICATIONS

Nunn, et al., "Enhancing multiphoton rates with quantum memories", Centre for Quantum Technologies, Sep. 9, 2018, 5 pages.
Hame, et al., "Direct generation of three-photon polarization entanglement", Institute for Quantum Computing and Department of Physics & Astronomy, Apr. 28, 2014, 9 pages.
Muller, et al., "On-demand generation of indistinguishable polarization-entangled photon pairs", Aug. 21, 2013, 9 pages.
Mattle, et al., "Dense Coding in Experimental Quantum Communication", Physical Review Letters, vol. 76, No. 25, Jun. 17, 1996, pp. 4656-4659.
Wang, et al., "On-Demand Semiconductor Source of Entangled Photons Which Simultaneously Has High Fidelity, Efficiency, and Indistinguishability", Physical Review Letters, vol. 122, 113602, 2019, 6 pages.
Chen, et al., "Heralded Quantum Random Access Memory in a Scalable Photonic Integrated Circuit Platform", Optical Society of America, 2021, 2 pages.
Cho, et al., "Highly efficient optical quantum memory with long coherence time in cold atoms", Optica, vol. 3, No. 1, Jan. 15, 2016, pp. 100-107.
Clemmen, et al., "All-optically tunable buffer for single photons", Optics Letters, vol. 43, No. 9, Apr. 27, 2018, pp. 2138-2141.
Ball, et al., "Quantum firmware and the quantum computing stack", Physics Today, vol. 74, Issue 3, Mar. 2021, pp. 28-34.
Kaczmarek, et al., "A Noiseless Quantum Optical Memory at Room Temperature", Frontiers in Optics, 2017, 2 pages.
International Search Report and Written Opinion received for PCT Application Serial No. PCT/US2021/030468 dated Mar. 15, 2022, 12 pages.
Riling et al., "Quantum Supremacy Circuit Simulation on Sunway TaihuLight", arXiv:1804.04797v3 [quant-ph], Aug. 13, 2018, pp. 1-11.
Zhang et al., "Examples on quantum search algorithm with optimized depth", Dec. 11, 2019, pp. 1-7.

* cited by examiner

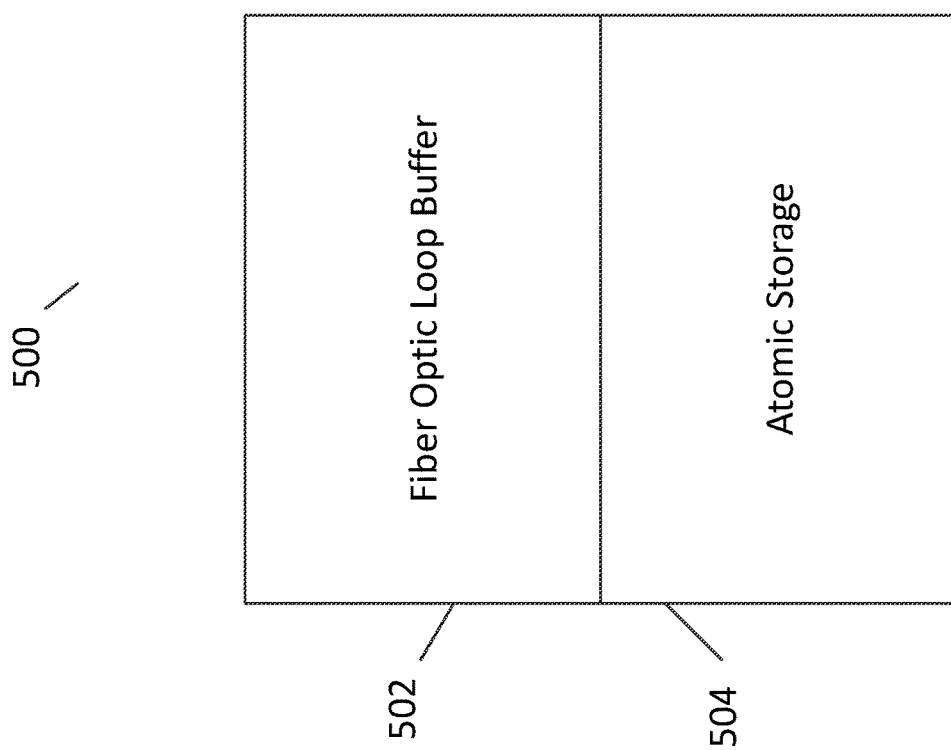

| Node 2 | Node 3 | Node 4 | | Node N | |
|--------|--------|--------|---|--------|---|
| Qubit 2.1 | Qubit 3.1 | Qubit 4.1 | | Qubit N.1 | |
| Qubit 2.2 | Qubit 3.2 | Qubit 4.2 | | Qubit N.2 | |
| Qubit 2.M | Qubit 3.M | Qubit 4.M | | Qubit N.M | |

FIG. 6B

SYSTEM AND METHOD FOR QUANTUM CACHE

The section headings used herein are for organizational purposes only and should not be construed as limiting the subject matter described in the present application in any way.

RELATED APPLICATION SECTION

The present application is a non-provisional application of U.S. Provisional Patent Application Ser. No. 63/020,221 filed May 5, 2020 and entitled "System and Method for Quantum Cache" and a non-provisional application of U.S. Provisional Patent Application Ser. No. 63/183,023 filed May 2, 2021 and entitled "System and Method for Quantum Cache". The entire content of U.S. Provisional Patent Application Ser. Nos. 63/020,221 and 63/183,023 and are herein incorporated by reference.

INTRODUCTION

Information systems today are highly distributed, and this trend is expected to continue especially as the next generation wireless systems keep people and machines connected anywhere and anytime. Applications and services increasingly rely on distributed information and processing to function, yet also increasingly aim to operate, look and feel like local systems. These kinds of future systems can benefit from improved methods of tagging, storing, and moving information, including systems that utilize so-called non-local operations and resources. For example, methods and systems that can provide precise location and timing information that is not dependent on a communication channel, or sensitive to time-of-flight delay of those channels, are highly desirable.

In addition, with so much information, including highly personal, confidential, and sensitive information, being an integral part of the applications and services on which people and machines rely upon, improved methods of tagging, storing and moving that information securely are also highly desirable. For example, methods of addressing that are not dependent on sending a plain text address on a communication link are desirable. In many cases, traditional classical systems have reached their technical limits on providing features to solve these critical problems. Quantum solutions can offer many important improvements. However, practical quantum systems are not currently available that fit seamlessly and effectively within classical information systems such that the underlying quantum phenomena can be used to improve performance.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale, emphasis instead generally being placed upon illustrating principles of the teaching. The drawings are not intended to limit the scope of the Applicant's teaching in any way.

FIG. 5A illustrates a diagram of an embodiment of a multilayer quantum store according to the present teaching.

FIG. 6B illustrates a table showing an embodiment of a structure of an entangled qubit cache for a multi-node network according to the present teaching.

DESCRIPTION OF VARIOUS EMBODIMENTS

Figure 1:
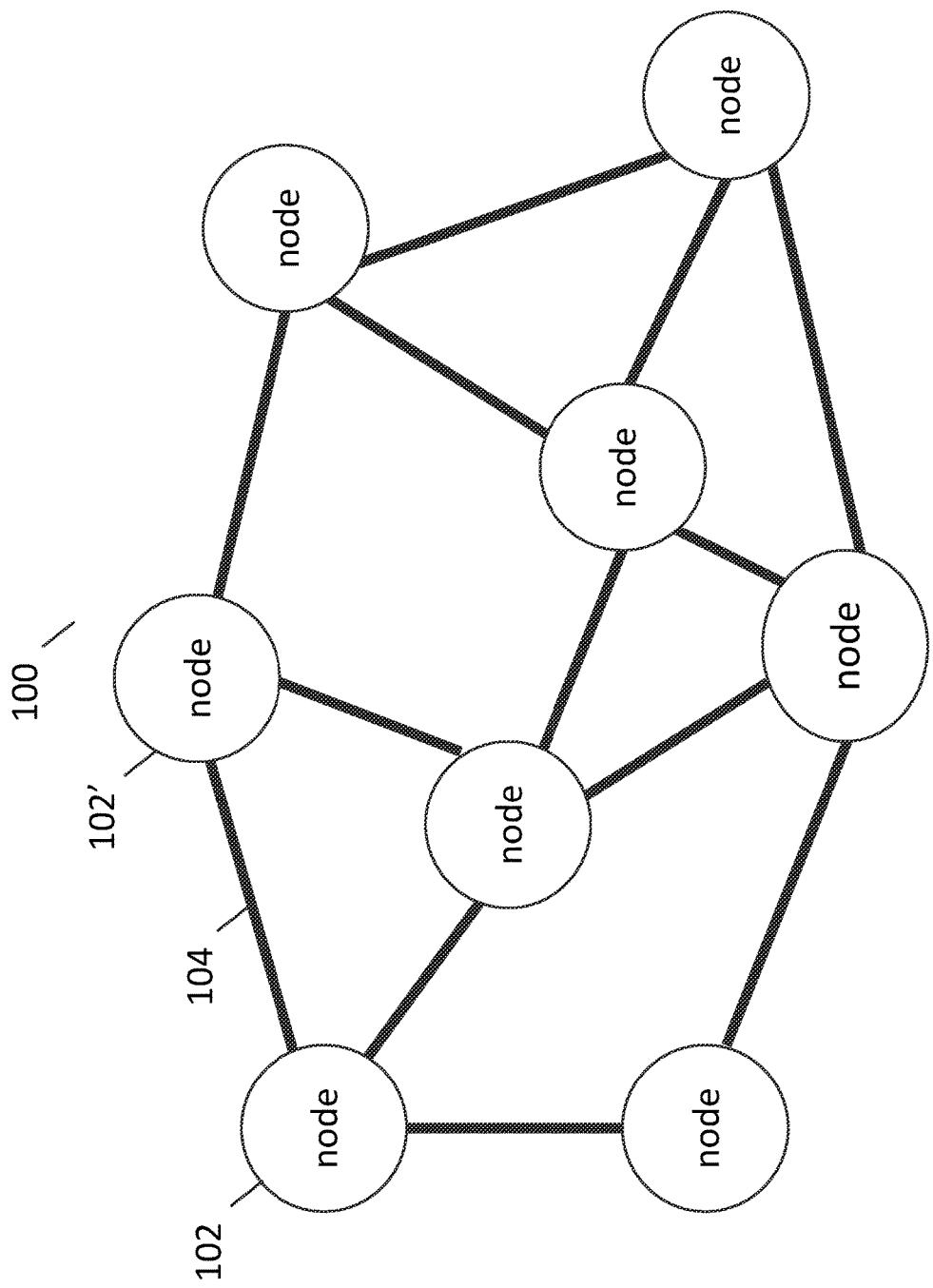
FIG. 1 illustrates a distributed system that can utilize a quantum entangled cache according to the present teaching.

The present teaching will now be described in more detail with reference to exemplary embodiments thereof as shown in the accompanying drawings. While the present teachings are described in conjunction with various embodiments and examples, it is not intended that the present teachings be limited to such embodiments. On the contrary, the present teachings encompass various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the methods of the present teachings can be performed in any order and/or simultaneously as long as the teaching remains operable. Furthermore, it should be understood that the apparatus and methods of the present teachings can include any number or all of the described embodiments as long as the teaching remains operable.

The present teaching relates to integrating quantum systems into traditional classical information systems to form various quantum information systems. These quantum information systems rely on their fundamental properties of quantization, superposition, entanglement and/or non-locality to provide various performance advantages and new features over similar classical versions of information system technologies. Some known examples of quantum information systems include quantum key distribution systems, analog and digital quantum computers, quantum communication links, and quantum sensors.

A particularly useful quantum object is the quantum qubit, which is a superposition state of two basis states, which can generally be described in Dirac notation as $|0\rangle$ and $|1\rangle$. Different physical manifestations of qubits, for example superconducting qubits, optical qubits, and atomic qubits, possess different physical manifestations for these basis states. However, these different manifestations can be expressed with similar mathematical representations and they behave in a similar way in a quantum system. It should be understood that the present teaching can apply numerous manifestations of quantum qubit systems.

The qubit coherent superposition of the basis states can be represented as $|\psi\rangle = \alpha|0\rangle + \beta|1\rangle$, where $\alpha$ and $\beta$ are complex numbers that represent a probability amplitude for each of the basis states that is governed by a Schrodinger equation, which describes how the state evolves in time based on its energy environment. The probability distribution, which is the magnitude squared of the probability amplitudes, indicates a probability a $|0\rangle$ or a $|1\rangle$ will result from a measurement of the qubit.

It is now widely accepted in the art that qubits can be entangled, which allows that future measurements of particular ones of their physical properties be perfectly correlated with the other qubits with which they are entangled. This feature of qubit entanglement is true even if the entangled qubits are separated in time and/or space. This is due, at least in part, to the quantized nature of the entangled quantum system, and the fact that the wave function that describes the quantum probability of the various superposed states of the system collapses to a single quantized state upon measurement.

Another feature of qubit entanglement is that measurement, as defined by the quantum theory, affects the entangled system as a whole, leading to a phenomenon in which a measurement at one location causes an outcome, in the form of a collapsed state (commonly referred to as a wave function collapse) that is perfectly correlated with the measured state, at another location. This wave function collapse, and the associated perfectly correlated outcomes at two locations, makes entangled qubits and, more generally, entangled distributed quantum systems, particularly useful resources in numerous types of information systems.

It should be understood that observing a quantum state is not necessarily a measurement of the quantum state. A measurement is an action that collapses the state of the wave function that describes the entangled system. Physicists will often define a measurement as an action that probes a path, or distinguishes with certainty, one of the possible states of the entangled system. Once discovered through measurement, a state of a quantum system is no longer in superposition, and no longer capable of maintaining a long-term correlation across its distributed system. Rather, the system irreversibly gives up this type of connection.

Various aspects of the present teaching take advantage of the fact that quantum systems provide an ability to establish a fidelity of entanglement separately from a measurement. In general, the fidelity of entanglement is a metric used to compare quantum states. The concept of fidelity of entanglement is straightforward in the case of pure states, but is subtler for the mixed quantum states found in real system. In other words, a quantum measurement is separable from other observations of the quantum state that allow one to determine if the state is still entangled. In fact, numerous methods are available to probe a quantum state for entanglement without disturbing the entanglement causing collapse of quantum states to occur where the system will then no longer be entangled.

Many quantum systems according to the present teaching take advantage of the fact that the quantum aspect of the system can be prepared with entangled states and distributed, physically or virtually, across various physical locations. These entangled states can be measured to provide perfectly correlated states to be determined at remote locations. One feature of these systems is that no physical channel is necessary to provide this correlated state determination. In various embodiments, the quantum-entangled systems of the present teaching are separated in space and/or time. Thus, various aspects of the present teaching advantageously utilize of the fact that the state collapse that provides a correlated state determination at two locations occurs both instantaneously and without regard to a distance between those locations, and/or any aspect of a precise position of those locations.

Furthermore, various aspects of the present teaching advantageously utilize the fact that any external influences, such as an eavesdropper, that make a measurement of the quantum system, will destroy the associated entanglement, causing a state collapse. Such a state collapse can be positively determined through various known mechanisms and protocols. Any observed or otherwise tampered quantum bit, or quantum subsystem, which relies on a quantum state, can then be discarded or disregarded as it no longer contains useful information. Thus, another aspect of the present teaching is that information systems according to the present teaching can operate securely, and/or ensure privacy from eavesdroppers or various outside influences for any outcome or measurement.

Another feature of the present teaching is the realization that hybrid quantum/classical systems can still continue to operate over various classical channels, and/or use classical connections to manage the information they process, store and communicate. As such, various embodiments of systems and methods of the present teaching still maintain data in a classical regime, and rely on any outcome or measurement associated with various ones of entangled qubits as classical metadata, rather than the quantum state itself.

Another feature of the present teaching is the recognition that management mechanisms are needed, or at least highly desirable, to control and manage the distribution and storage of quantum states. Quantum states can be transferred and stored using any of numerous mechanisms depending on the particular application and the method of generating the quantum state. The mechanisms used to control and manage the quantum physical systems that generate the quantum states must recognize the key performance attributes of the physical qubits combined with the needs of the systems that are using the quantum state for various applications. Said another way, one feature of the present teaching is providing various methods and apparatus for providing appropriate abstraction(s) that operate between the quantum physical systems that supply quantum states, and the classical, semi-classical, and/or quantum information systems that use that quantum states for various applications. The abstraction(s) make it possible for system designer who are not skilled in the art of quantum systems but, are skilled in the art of classical system to include quantum systems as part of designing solutions, thus providing a relatively simple interface bridge between quantum and classical systems.

Numerous important quantum applications utilize entangled qubits distributed in a network. The term "network" as used herein is a very broad term that relates to a collection of two or more node associated with information. FIG. 1 illustrates an embodiment of a distributed system 100 that utilizes a quantum entangled cache according to the present teaching. A plurality of nodes 102 are connected by links 104. In general, the nodes 102 include both quantum systems and classical systems. Also, in general, the links can include classical transport or connections, can also include quantum transport or connections, and can also include links that can transport and/or connect both quantum and classical data as described herein. The distributed system 100 is a mesh topology with nodes 102, 102' and links 104. However, it should be understood that the present teaching can be applied to numerous different and hybrid topologies. For example, the present teaching can be applied to bus, star, tree, ring, point-to-point, hybrid and other network topologies.

In some embodiments of the distributed system 100, entangled pairs, or more generally, larger groupings of N-entangled qubits, such as three, four, or more entangled qubits in a group, are needed to be available in any number of entangled dimensions, K, when needed. In other words, the distributed quantum entanglement cache of the present teaching can include a source of entangled quantum states that generates quantum states having a plurality of entangled quantum states. Thus, qubits can be shared with N nodes and include K basis states. The qubits are entangled and coherent to some degree when used in a node 102, 102'. Thus, for some configurations, a mechanism is used in the nodes 102, 102' to ensure coherent qubits, and to discard qubits that are not coherent.

In some embodiments of systems according to the present teaching, a mechanism is used in the nodes 102, 102' or elsewhere to supply verified coherent qubits. Also, in some embodiments of systems according to the present teaching, a mechanism is used to ensure a supply of qubits that exceeds a predetermined percentage of coherent qubits out of a pool of qubits available in the node.

In addition, it is important that the qubits be indexed so that pairings are maintained between qubits in one node 102 compared with another node 102'. Some embodiments of quantum distributed systems 102 according to the present teaching have mechanisms to ensure that qubits are accessed with a latency that is compatible with the particular application. For example, a mechanism can be used to appropriately synchronize the availability of sets of from 2-N entangled qubits between 2-N nodes 102, 102' to ensure desired access latency and support the pairing of those qubits. The indexing in the nodes 102, 102' allows various pairings, or N-way entangled quantum states, to be identified with each other. That is, an index can be used to indicate which other node(s)' quantum states a particular quantum state is entangled with.

The embodiment of the distributed system 100 in the description associated with FIG. 1, as well as other embodiments described herein, describe the use of caches that include entangled quantum states. However, it should be understood that caches of the present teaching are not limited to entangled quantum states. As described herein, embodiments of quantum stores and quantum caches can include and utilize quantum states that are not entangled states and/or quantum states that are entangled quantum states.

Figure 2:
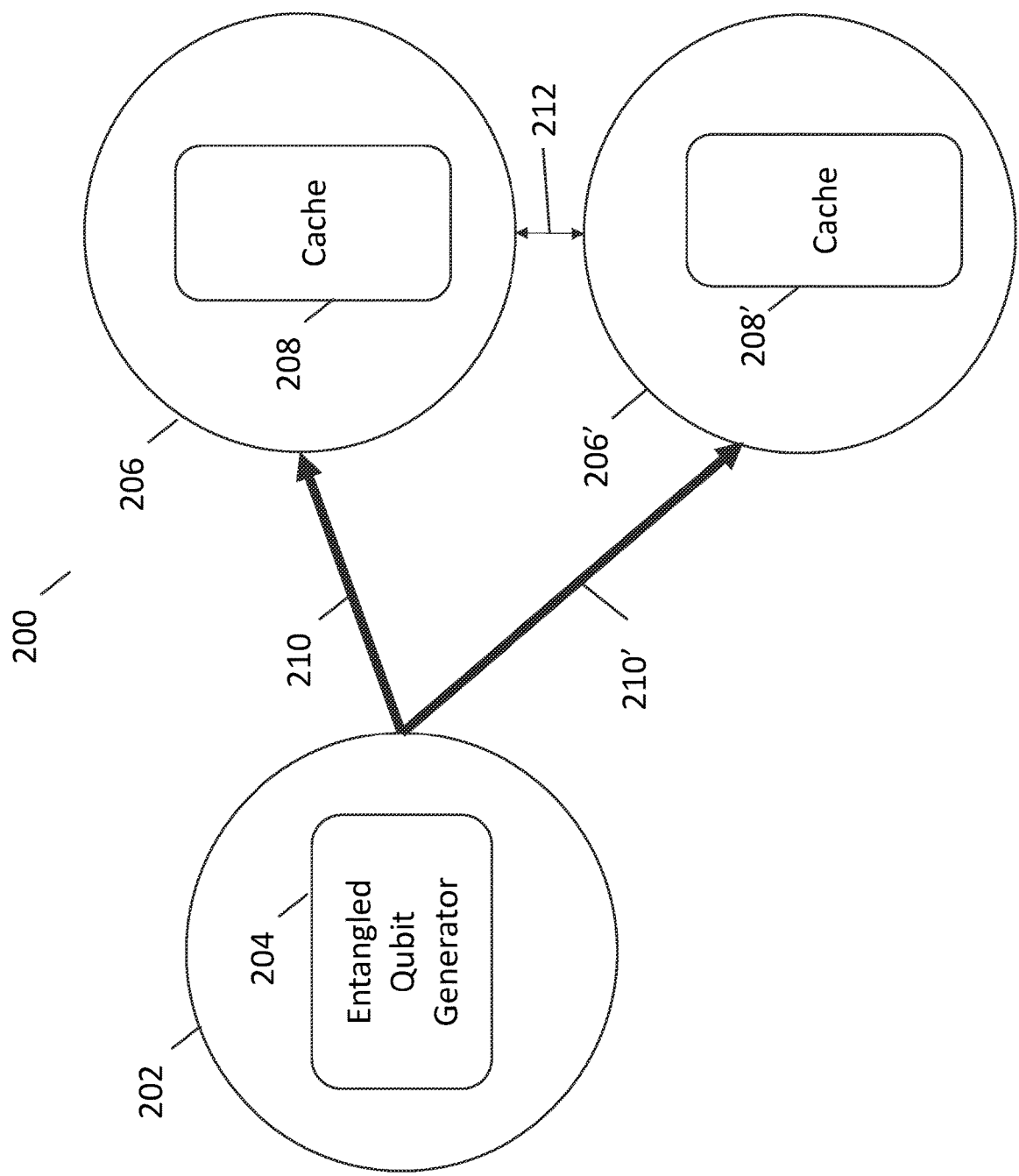
FIG. 2 illustrates an embodiment of a portion of the distributed system described in connection with FIG. 1 that includes nodes using a quantum entangled cache and a node using an entanglement server according to the present teaching.

FIG. 2 illustrates an embodiment of a portion of the distributed system 200 of FIG. 1 with a node 202 that performs as an entanglement server using an entanglement generator 204 and nodes 206, 206' using a quantum entangled cache 208, 208' according to the present teaching. The node 202 is connected by links 210, 210'. Numerous embodiments of the present teaching use a centralized and/or distributed mechanism for distributing entangled qubits.

Entangled qubits are supplied by entanglement generators 204. The distributed system 200 shown in FIG. 2 illustrates only two nodes 206, 206' that receive entangled qubits, and a node 202 connected to two links 210, 210' that provides entangled quantum resources on those links 210, 210' for clarity. Distributed systems 200 according to the present teaching are not so limited. For example, many nodes can receive entangled resources. The entangled resource generator 204 can generate entanglement across more than two qubits, and so can be provided across more than two links 210, 210'. Nodes 202, 206, 206' can include either or both of server node resources 204 and cache resources 208, 208'. Also, multiple entangled qubit generators 204 can connect different and/or the same caches 208, 208'. It should be understood that a diverse array of quantum and classical network connections can be realized using the present teachings.

One feature of the present teaching is the recognition that deterministic and on-demand sources of entangled photons can easily be integrated into systems using classical indexing corresponding to particular quantum states as well as other information associated with the quantum state generation. Ideal deterministic sources produce entangled photons at known times and with 100% fidelity. In practice, deterministic sources approach these goals with a known and/or characterizable high probability (and/or fidelity) that a pair, or set, of entangled photons is produced at a known time. While these terms are often used interchangeably, for purposes herein, on-demand sources produce entangled photons at arbitrary but controllable times while deterministic sources produce entangled photons at known, predetermined, times with high probability. Importantly, both of these types of controllable emission quantum entangled photon sources are amenable to attaching associated classical data, including indexing information and quantum integrity information. Associated classical data can be referred to as meta data.

Some embodiments of the entanglement server 204 use a deterministic source of entangled photons that is generated by multiplexing and/or switching of non-deterministic quantum photon sources. Many known high-brightness sources of entangled photons are so-called non-deterministic sources that produce entangled photon pairs (and larger entangled sets), but at random times. For example, spontaneous parametric down conversion (SPDC), four wave mixing, and various other nonlinear parametric processes are known to provide entangled photons with a high rate, though with non-deterministic emission times. Multiple systems and methods have been shown to provide deterministic photon sources using multiplexing and/or switching schemes combined with non-deterministic sources. See, for example, Evan Meyer-Scott, Christine Silberhorn, and Alan Migdall, "Single-photon sources: Approaching the ideal through multiplexing", Review of Scientific Instruments 91, 041101 (2020), which is incorporated herein by reference. As one example, a quasi-deterministic source can generally provide photon pairs and photon clusters (>2 entangled photons) substantially more than 60% of the time in a given time slot, with 99% fidelity. See, for example, Jeffrey H. Shapiro and Franco N. Wong, "On-demand single-photon generation using a modular array of parametric downconverters with electro-optic polarization controls," Opt. Lett. 32, 2698-2700 (2007), which is incorporated herein by reference. With such sources, it is possible to provide a time window, including a repetitive time window for which an entangled photon pair will be provided at a particular position in the system, and it is also possible to specify that only 1% of the time windows would have faulty quantum states (e.g. more than one photon).

Some embodiments of the entanglement server 204 use a deterministic source of entangled photons that is generated by known, predetermined loading or setting of quantum emitting states in the source. For example, various configurations of quantum dot sources can be used. See, for example, Hui Wang, Hai Hu, T.-H. Chung, Jian Qin, Xiaoxia Yang, J.-P. Li, R.-Z. Liu, H.-S. Zhong, Y.-M. He, Xing Ding, Y.-H. Deng, Qing Dai, Y.-H. Huo, Sven Höfling, Chao-Yang Lu, and Jian-Wei Pan, "On-Demand Semiconductor Source of Entangled Photons Which Simultaneously Has High Fidelity, Efficiency, and Indistinguishability," Phys. Rev. Lett. 122, 113602, (2019), which is incorporated herein by reference. Also see, for example, Müller, M., Bounouar, S., Jöns, K. et al., "On-demand generation of indistinguishable polarization-entangled photon pairs," Nature Photon 8, 224-228 (2014), which is incorporated herein by reference. Advantageously, the ability to index the expected arrival slot or position of the entangled photon events can be provided for these kinds of sources. In addition, it is possible to provide associated classical data regarding, for example, the number of indistinguishable events (e.g. identical photon states) that will follow a prepared excitation state, the expected fidelity (dephasing, added background) and other associated classical information about the entangled photons that allow these sources to be generally described and incorporated as part of a larger system as described herein. The classical information can be tagged to an individual entangled photon event or a larger set of events, depending on the source. One feature of the present teaching is that the classical tagging process allows multiple types of sources to be used in the same system.

In some embodiments, the entanglement generator 204 can transmit generated entangled qubits using links 210, 210' to the nodes 206, 206'. These transmitted qubits may be sent in quantum channels that are embedded in, or separate from, any classical channel(s) that is used for the links 210, 210' using various systems and methods for transmitting entangled qubits. The entanglement generator 204 can be electronic and can generate entangled electronic qubits that are transmitted electronically. The entanglement generator 204 can also be optical. For example, the entanglement generator 204 can be an entangled photon source that generates entangled photons. These photons are sent over links 210, 210' that include optical fiber that transmits the entangled photons. These links could also be free space. Nodes 206, 206' include a quantum entangled cache 208, 208' for storing and retrieving entangled qubits at each node 206, 206'. Practical systems will appropriately balance the speed at which entangled bits are generated and consumed for a particular coherence half-life of the entanglement.

The quantum entangled caches 208, 208' can include a mechanism for determining the coherence of qubits at each node. Coherence is a metric of the degree of entanglement. In some embodiments, this mechanism includes a coherence detector with some discard mechanism. In some particular embodiments, this mechanism has knowledge of reliable statistics on coherence half-life and uses at least one of many different types of error correcting coding. Qubits may be discarded after an age-out, for example after a known half-life, or alternatively an age-out based on a known error rate or error condition. In some embodiments, both these mechanisms are used. Some embodiments rely on entanglement purification, which uses measurements on a number, n, of adjacent qubits to determine with high probability that a given qubit is entangled. Thus, various mechanisms can be used to determine coherence of one or more qubits that are part of an entangled system.

The quantum entangled caches 208, 208' also include a synchronization mechanism that ensures matched pairs or sets of qubits are in use at the various nodes 206, 206'. The synchronization may, for example, be associated with a particular known order of qubits in the cache that is associated with, or registered to, another order of qubits in another node. In some embodiments, the synchronization mechanism is an ordered cache. In some embodiments, the synchronization mechanism uses classical channel information exchange. For example, the order of qubits in two different nodes can be exchanged and updated as the order changes. Also, in some embodiments, the nodes are connected via a communication channel 212 that can support one or both of quantum and classical communications. This channel 212 may be the same or different from the links 210, 210' that transmit photons to the caches 208, 208'.

Figure 3:
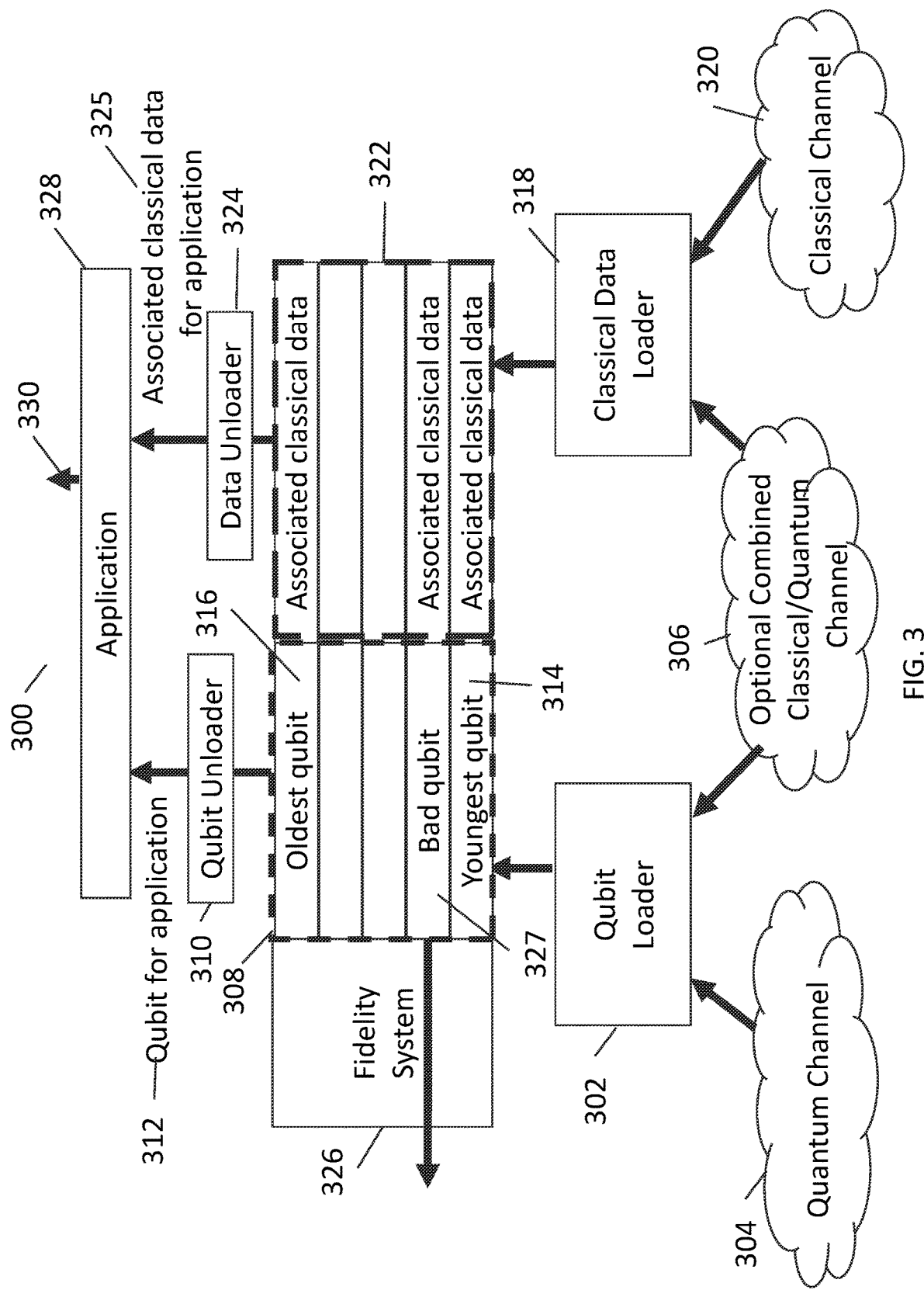
FIG. 3 illustrates a block diagram of an embodiment of a quantum entangled cache according to the present teaching.

FIG. 3 illustrates a block diagram of an embodiment of a quantum entangled cache according to the present teaching. Qubits are supplied to a qubit loader 302 from a quantum channel 304 and/or a combined quantum-classical channel 306. The supplied qubits are entered into a qubit store 308, which is a quantum store. The qubit store 308 is a physical storage system that holds and maintains, to a predetermined acceptable degree, the entanglement and coherence of ordered qubits. Thus, the qubit store 308 generally accepts qubit state from the loader 302 into a physical mechanism that can maintain the coherence and entanglement of the qubit in an ordered way, such that an unloader 310 can access and supply that state to an application 312. The qubit store 308 is shown in FIG. 3 as a first-in-first-out (FIFO) structure such that the youngest qubit (to the cache) sits at the bottom slot 314 and the oldest qubit sits at the top slot 316 of the qubit store 308 so that the oldest qubit would be next available to supply for an application 312. It should be understood that the terms "top" and "bottom" are relative terms used to describe the present teaching, but may or may not be representative of a practical qubit storage system. For example, one skilled in the art will appreciate that qubit store 308 could be implemented in numerous ways such as with a simple fiber delay line, where a photonic qubit enters the delay line and would be the first to exit the delay line to be used by an application connected to the store. In various embodiments, the qubit loader 302 and/or the qubit unloader 310 can comprise, for example, a passive coupler/splitter, a quantum switch, an optical switch, a quantum wavelength converter, a quantum repeater, and/or a quantum state converter.

Multiple types of storage systems are contemplated by the present teaching. Various embodiments of the qubit store 308 can have various physical implementations and operation. This includes, for example fiber loops, including hierarchical fiber loops, which can achieve a variety of input-output relationships between loaded photonic qubits and unloaded photonic qubits. For example, FIFO, last-in-first-out (LIFO), or other interleaved access architecture can be realized. In addition, numerous types of memory devices, such as those based on ions or atoms, are suitable for use as random access memory devices, as slots can be associated with positions on, for example, a lattice or other ordered physical arrangement that supports the particular quantum system. For example, slots might be associated with positions of nitrogen vacancies in a diamond lattice. Thus, quantum entangled caches of the present teaching are compatible with a variety of storage structures including random access storage structures and stack-type storage structures, such as FIFO and LIFO.

A classical data loader 318 takes in data from a classical channel 320 and/or optionally a combined classical-quantum channel 306. The classical data loader 318 loads the data that is associated with particular qubits into a classical store 322 that holds and maintains the classical data associated with particular qubits. The classical store 322 is conventional computer memory that can be volatile or non-volatile memory that can take numerous forms that are well known in the computer hardware art. A data unloader 324 can provide the classical data associated with a particular qubit to an application 325 such that the application is then able to use any subsequent information about the state of the qubit effectively in the application. Subsequent information includes, for example, information obtained by processing the qubit in a quantum logic element, making state-collapse inducing (non-unitary) measurement operations on the qubit, and/or making measurements on the qubit that do not collapse the qubit state, but rather provide information about the state of the qubit or other qubit properties. Thus, one aspect of systems and method of the present teaching is that the quantum entangled cache 300 holds and maintains classical data associated with a qubit and provides that data to a higher-layer application to aide in the application processing of the qubit.

The quantum entangled cache 300 includes a fidelity system 326 that is connected to the quantum store 308 and to the classical store 322. The fidelity system 326 can identify and remove or otherwise reject bad qubits, such as a bad qubit in slot 327. This would include, for example, qubits that have or will soon collapse and/or have lost certain predetermined fidelity, entanglement and/or coherence properties. The fidelity system can tag a bad qubit to inform a user that it is bad. It should be understood that the fidelity system 326, as well as the associated configuration of the quantum cache 300, can be configured to operate with populations of qubits, and not necessarily at a single qubit-by-qubit level in a deterministic way. That is, groups of qubits representing a single qubit state are anticipated, and qubit states are represented by measurements on the ensemble. In these systems, predetermined fidelity levels would be expected to be based on ensembles. Fidelities, entanglement and/or coherence properties can be non-deterministic and represented by probabilities and/or other statistical metrics.

Quantum purification techniques can be applied to these ensembles by the fidelity system 326. Generally, the fidelity system is responsible for maintaining qubits or qubit ensembles in the store at a known good fidelity level for the subsequent provision of that qubit state to an application 312, and also for updating, as needed, the associated classical data of that qubit with information regarding the fidelity. The fidelity system 326 can remove bad qubits from the store either physically or prevent bad qubits from being unloaded and/or subsequently used based on associated classical data information.

In some embodiments, the qubit unloader 316 is connected to an application 328. The application may include a quantum measurement system (not shown). In these embodiments, the quantum measurement system determines a state of the qubit in the qubit unloader, and this state value is used by the application. For example, the state value may be the same as a state value determined by a measurement of another qubit in a remote cache with which the qubit in the qubit unloader is entangled.

In some embodiments, the application 328 includes a quantum processor system (not shown) that uses the stored quantum state information. The quantum processor can include various quantum logic elements that perform unitary and/or non-unitary transformations on the quantum state. For example, CNOT, Hadamard and/or Pauli-Z/or Pauli-X/ or Pauli-X and Pauli-Z and/or measurements can be performed by the application 328.

In some embodiments of the system and method of the present teaching, the qubit unloader 310 and the data unloader 324 are connected to an optional communications channel 330 via the application 328. The channel 330 can support one or both of quantum communication or classical communication via separate or combined channels. The channel 330 allows the application 328 to connect separate quantum entangled caches 300 together to share either the quantum information or the classical information. The channel 330 can be used to exchange qubits directly from the qubit unloader in one or the other separate quantum entangled cache and/or qubits that are processed by quantum logic elements that are connected to both the channel and to the qubit unloader 324 in one or the other quantum cache.

Figure 4:
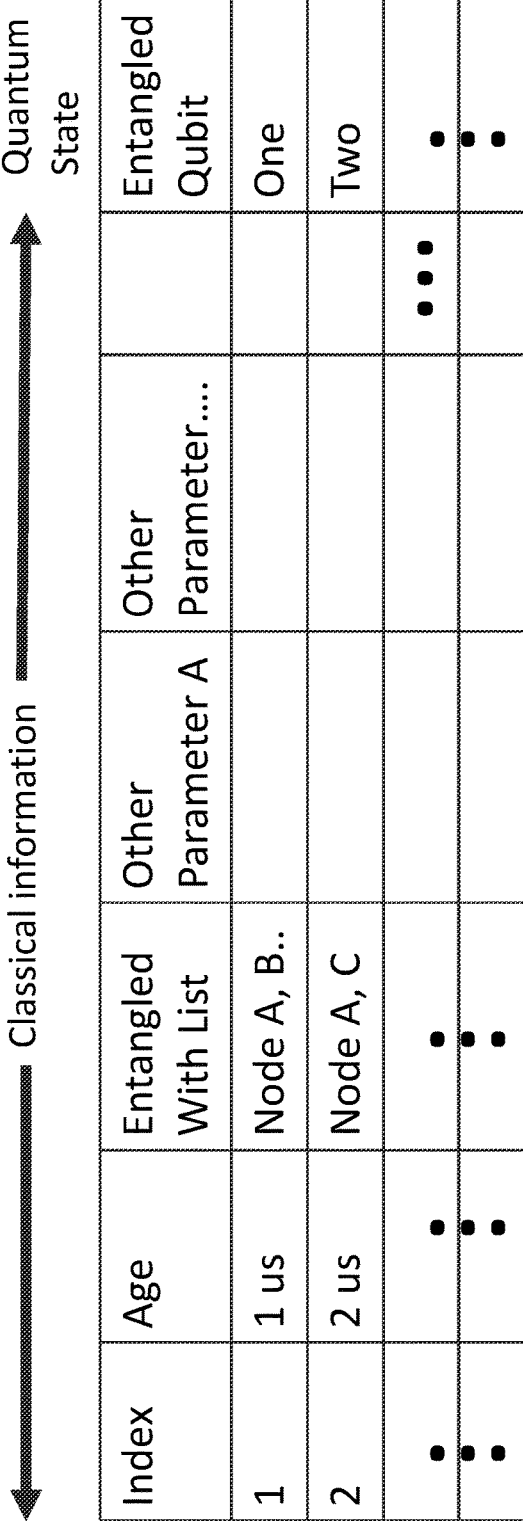
FIG. 4 illustrates an embodiment of a table showing a cache structure for a quantum entangled cache according to the present teaching.

FIG. 4 illustrates an embodiment of a table 400 showing a cache structure for a quantum entangled cache according to the present teaching. The cache structure shown in the table 400 includes fields for both classical information and quantum information. For example, an index field and an age field are provided. The index associates particular items of classical data (e.g. various meta data) with particular ones of the plurality of quantum states. There is also a field for describing which nodes hold the qubit that the qubit is entangled with. There can be fields for other parameters, for example, type of qubit, half-life of qubit, qubit error rate, qubit access time, and other parameters. Fidelity information can be included. The classical information is tagged, in other words indexed, to a particular qubit that resides in the cache, and is also maintained and updated, as needed, as the qubit is stored in the cache.

Another feature of the systems and methods of the present teaching is that it accommodates the fact that qubits generated by different physical manifestation have different properties and offer different parameters that can be part of the classical information. For example, some physical qubits can be stored for long time, some physical qubits preserve entanglement longer than others, some physical qubits are easy to access and use, and other physical qubits require more complex and time-consuming access schemes. These different physical qubit manifestations can have different associated classical information that is appropriate to the physics of those particular qubit manifestations. The qualities of the different physical qubits can influence the design of a cache. As one example, some embodiments of quantum entangled caches according to the present teaching use layered cache systems.

FIG. 5A illustrates a diagram an embodiment of a multilayer quantum store 500 according to the present teaching. The multilayer quantum store 500 has a top layer 502 and a bottom layer 504. In this example, the top layer 502 represents a relatively fast-access time, but relatively low storage time store system, where the bottom layer 504 represents a relatively slow access time, but relatively longer term storage system. In some embodiments, the top layer 502 can be a fiber optic loop buffer storage system that holds photon qubits. These photon qubits can be single photon qubits, frequency entangled photonic qubits, or they may be polarization encoded qubits. In some embodiments, the bottom layer 504 is an atomic qubit storage system. This bottom layer 504 can include any of a variety of known atomic qubits. The top layer 502 is used first. This is because the top layer 502 provides low latency access to qubits, albeit with qubits that preserve entanglement for less time. The bottom layer 504 is used for cases where the system can support a higher latency access. In some embodiments according to the present teaching, the bottom layer transfers qubits to the top layer when time allows, optimizing the tradeoff between latency and entanglement half-life for a particular application. Bottom layer qubits preserve entanglement for longer periods of time. For example, photonic qubits are generally difficult to hold for long periods of time, but simple to access, and so are accessed with lower latency. Atomic qubits can maintain an entangled state for longer time periods; but have a higher latency for access. Photons are also generally a plentiful resource, while atomic qubits are less abundant. The multilayer quantum store 500 of the present teaching appropriately manages and allocates the physical qubits based on their individual characteristics. Thus, one key benefit of quantum caches of the present teaching is that they provide a mechanism that allows classical systems to effectively utilize the quantum states and/or quantum properties from different quantum physical systems with a common interface and/or representation.

Various known fiber buffers can be used to short-term store, delay or buffer, photons that carry quantum states. For example, fiber loop buffers, various optical cavities such as fiber Bragg cavities, slow light systems. Various nonlinear (for example, four-wave mixing) schemes can be used to produce various short, long and/or controllable delay of a quantum photon(s) passing through the fiber. Importantly, for systems and methods of the present teaching, various known attributes (active and passive) of the fiber buffer produce predetermined delay properties of the buffer, and therefore are amenable to being part of the classical information to be tagged with one or more of the photons that are input to the buffer.

Fiber optic buffers are particularly appropriate as the top layer 502 of the quantum storage system. As one example, in some embodiments of the present teaching, the top layer 502 of the physical storage system comprise a fiber optic buffer that has tunable delay. See, for example, Stéphane Clemmen, Alessandro Farsi, Sven Ramelow, and Alexander L. Gaeta, "All-Optically Tunable Buffer for Single Photons," Opt. Lett. 43, 2138-2141 (2018), which is incorporated herein by reference. One feature of this kind of buffer is that an input pump laser wavelength produces a delay of a quantum-encoded photon. For example, a range of over several nanoseconds of delay can be deterministically realized by tuning the pump wavelength across a range of wavelengths. Thus, the particular (and variable) delay information can be included in classical information associated with the qubit in these kinds of short term fiber buffer stores. Another feature of this kind of buffer is that a bandwidth of the optical photon that is input to the buffer determines the delay. As such, classical information associated with the known input spectrum of the quantum encoded photon provides information about the realized delay in the short-term store.

In addition to the shorter term stores (for example, fiber optic buffers), various known atomic and ion-based systems can be used to construct quantum stores that store quantum state information according to the present teaching. In addition, the quantum information can be transferred from photonic states to the electronic states of atomic and ion systems. That is, quantum states carried by photons can be stored in electronic states in various ions and atoms to realize these longer-term quantum storage systems and also be read out of the systems as photons and detected. The quantum states stored in atomic and ion-based memories can also be read (measure) directly in the electronic domain.

There are numerous known protocols for realizing quantum atomic memories including, for example, electromagnetic induced transparency (EIT), reversible inhomogeneous broadening (CRIB) and atomic frequency combs (AFC) that can be used for quantum caches of according to the present teaching. See, for example, Heshami K, England D G, Humphreys P C, et al., "Quantum memories: Emerging Applications and Recent Advances," J Mod Opt. 63, 2005-2028 (2016), which is incorporated herein by reference. While this is expected to change as technology evolves, it is generally accepted that losses in optical-fiber-based buffers can limit storage times to less than a few tens of microseconds. On the other hand, atomic systems, particularly cold atomic systems can hold quantum state for times scales on order of seconds or more. These numbers are just illustrative and not intended to limit the present teaching in any way, but they serve to illustrate the need for different layers of cache to support a wide range of storage and access times.

Atomic memories are particularly appropriate as the bottom layer 504 of the quantum storage system as they generally exhibit longer storage times. As one example, in some embodiments of the present teaching, the bottom layer 504 of the physical storage system comprise a cold-atom-based optical quantum memory. See, for example, Y.-W. Cho, G. T. Campbell, J. L. Everett, J. Bernu, D. B. Higginbottom, M. T. Cao, J. Geng, N. P. Robins, P. K. Lam, and B. C. Buchler, "Highly Efficient Optical Quantum Memory with Long Coherence Time in Cold Atoms," Optica 3, 100-107 (2016), which is incorporated herein by reference. One feature of this kind of memory is it efficiently absorbs photons, and also has low de-coherence. In these systems, optical quantum states are loaded into a cold atomic gas that is prepared by an applied magnetic field gradient so spectral components are encoded across the gradient. A controlled reversal of the applied magnetic field generates a photon echo from the gas that represents the quantum state of the input optical photon. In these systems, the storage time is a function of the input control pulse duration. The ability to cool the gas affects the de-coherence time. Thus, known and controllable parameters of the memory implementation (for example, optical control powers and optical bandwidths, applied magnetic fields, readout pulse energy bandwidths, etc.) are directly related to the memory quantum performance metrics, such as storage time, readout time, de-coherence, etc. Regardless of the particular atomic memory protocol, it is thus possible to tag stored quantum states with associated classical information that allows control of a quantum cache system independent of a particular physical implementation of the memory.

It should be understood that the quantum store physical systems described herein are only some possible specific examples of quantum stores that could be used in the methods and apparatus of the present teaching. Various known quantum optical buffering and memory schemes have particular classical information associated with the properties of the stored qubit based on the particular properties and protocols of the physical store system. For example, operating parameters, such as delay, memory depth, storage time, loading latency and/or unloading latency can be tagged. In addition, various impairments, such as various losses, de-coherence mechanisms, dephasing effects, added background and various other nonlinear impairments that affect the quantum state can also be tagged. In addition, as systems and methods for physical quantum storage mature, the kinds of classical information will change and grow. A feature of the methods and apparatus of the present teaching is the use of an abstraction layer that accommodates the anticipated changes and maturation of the underlying physical systems. Thus, embodiments of the multi-layer quantum store 500 can work not only with some of the example physical systems provided herein, but other known and future physical quantum store systems as they emerge. In other words, the present teachings are not limited by specific types of quantum store systems.

Figure 5B:
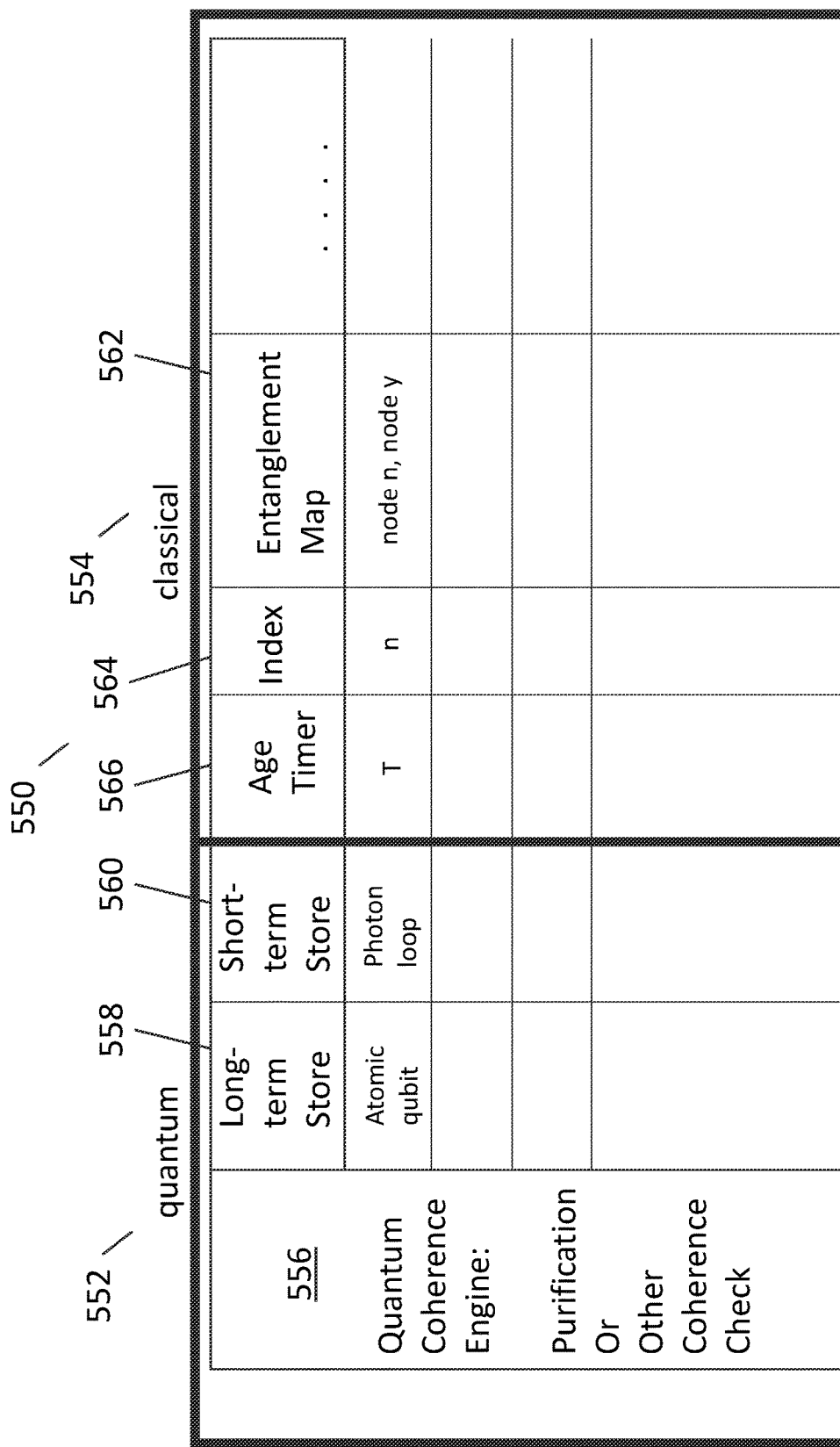
FIG. 5B illustrates a table showing a cache structure for a multi-layer quantum entangled cache according to the present teaching.

FIG. 5B illustrates an embodiment of a cache 550 that includes a physical structure with metadata for a multi-layer quantum entangled cache according to the present teaching. The cache 550 includes both software/information and hardware. There is a quantum element 552 and a classical element 554. A fidelity system includes a quantum coherence engine 556 that is connected to the physical qubits in a long-term quantum store 558, and a short-term quantum store 560. The physical qubits in the long-term quantum store 558 can be, for example, atomic qubits in an atomic memory. The physical qubits in the long-term quantum store 558 can be electromagnetically-induced-transparency atomic quantum memories. The physical qubits in the long-term quantum store 558 can be any of various other kinds of known long-term quantum memories. In various embodiments of the methods and apparatus of the present teaching, the long-term memories have a half-life that is nominally tens of microseconds, milliseconds, seconds, or tens of seconds. The physical qubits in the short-term quantum store 560 can be, for example, photonic qubits in a fiber loop memory. The physical qubits in the short-term quantum store 560 can be single-nitrogen-vacancy-center quantum memories. The physical qubits in the short-term quantum store 560 can be any of various other kinds of known short-term quantum memories. Also, in various embodiments of the methods and apparatus of the present teaching, the short-term memories have a half-life that is nominally nano-seconds to microseconds. Other important factors for the choice of a quantum memory system include, for example, the read-out mechanism, the quantum fidelity, the storage efficiency, the time-bandwidth product, stability and noise as just some specific examples.

The quantum coherence engine 556 uses purification, or some other non-measurement monitoring technique, to inspect qubits in the short- and long-term store 558, 560 to interrogate their coherence level. This all takes place on the quantum side 552 of the cache. When the coherence engine 556 decides qubits are bad, it then sends over a classical channel notification to all other caches of entangled qubits so those nodes do not use those qubits. The cache 550 uses the entanglement map information 562 in the classical part 554 of the cache 550 to determine which nodes must be notified of qubits that are timed-out.

In some embodiments, when a qubit is retired because it has exceeded its lifetime, the whole cache pops up like a stack in a processor. The qubits on top are the oldest, and most likely to go bad, but if something in the middle of the cache times-out or is determined to be not coherent or entangled, the one below it moves (pops) up one step. When a qubit is pulled from a cache and measured as part of any algorithms, that qubit becomes stale. All other node caches need to know this information as well. Each cache may determine this information on their own by, for example, by independently measuring lifetime, or, in some embodiments caches can be provided this information, like in the case of an expired or timed-out qubit, a classical channel communication protocol process is used for this notification. In a stack model, you just need to keep synchronized with index numbers in an index column 564 because you know qubits are moving along toward the top of the stack.

In some embodiments, once qubits reach a predetermined age threshold, T, the probability they are out of coherence is relatively high. A classical age timer keeps track of this time and can automatically remove aged-out qubits. The value of T is retained for each qubit in an age timer 566 column of the cache to be associated with each qubit or groups of the same type of qubit. This is in the classical part 554 of the cache 550. There may be two physical age timers, for example, one for the long cache and one for the short cache. This is useful is some systems because the long atomic cache might have a longer half-life. The advantage to using the age timer is that if all nodes agree on a timing parameter, then messages are not necessary, and classical communication is not required to indicate if a qubit went bad (lost is quantum state information). In these particular examples, all nodes are synchronized and will remove aged-out qubits at the same and/or appropriate times.

In some embodiments of methods and apparatus according to the present teaching, everything stays in the long-term store 558 until it gets near the top of the stack. Then the qubits get transferred to the short-term store 560 so that they are available for immediate use. Then, if qubits remain in short-term store 560 for too long, the age timer goes off and they are discarded and a classical message is sent to inform the other nodes to shift up the appropriate stacks.

Another feature of the quantum caches of the present teaching is that they can be used in connection with numerous networked applications. Referring back to FIG. 3, numerous applications 328 that run across multiple nodes in a network (of various kinds) can receive qubits for application 312 and/or associated classical data for application 325 from the quantum store 308 and/or the classical store 322 in each node. Some example multiple-node applications are described below.

Figure 6A:
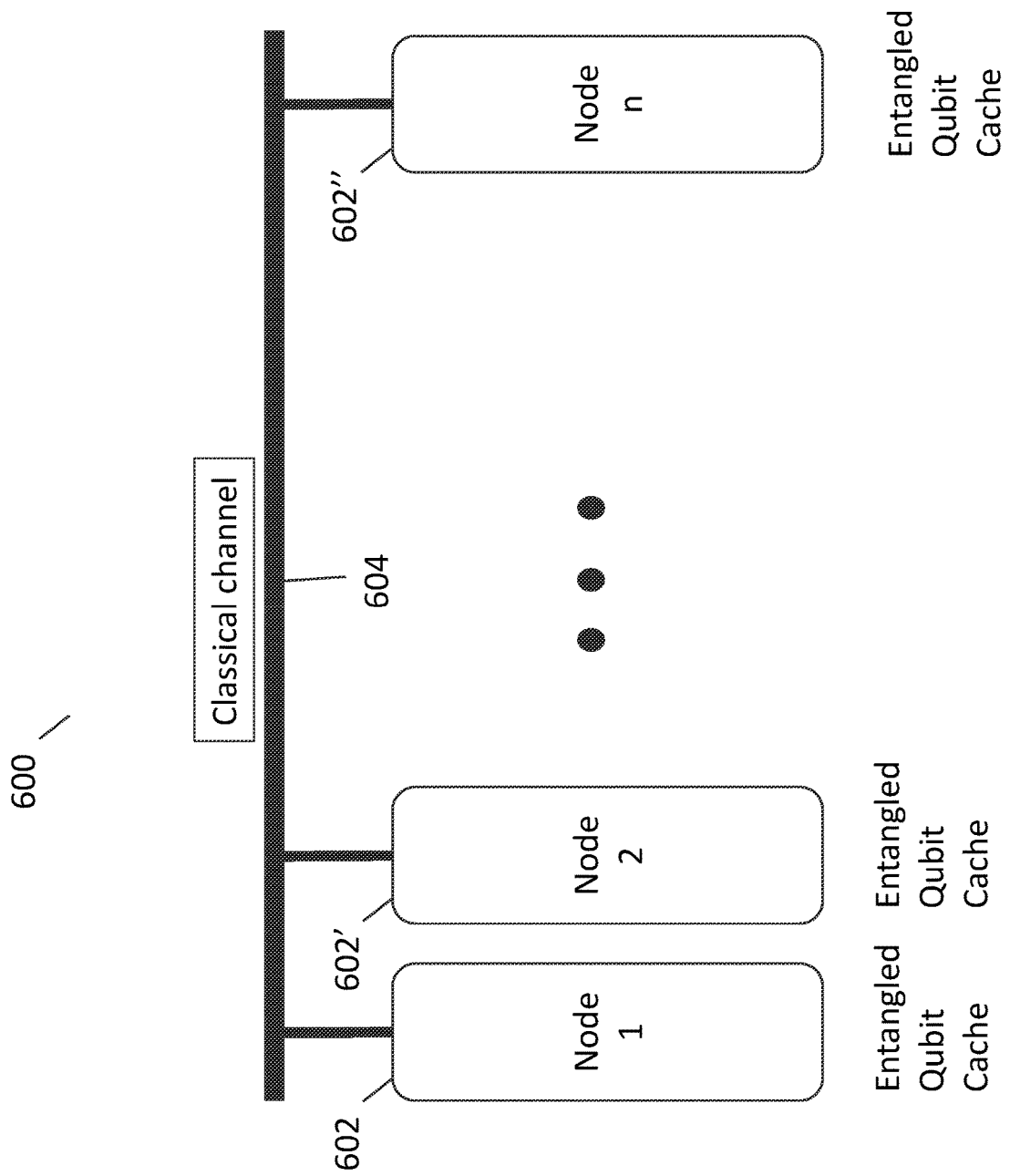
FIG. 6A illustrates an embodiment of a bus network using an entangled cache according to the present teaching.

FIG. 6A illustrates an embodiment of a bus network 600 using an entangled cache according to the present teaching. A bus network 600 is just one particular example. It should be understood that other network architectures can be implemented. A number, n, of nodes 602, 602', 602" are connected to a classical channel 604. Each node 602, 602', 602" has an entangled qubit cache. The caches are supplied by an entanglement server (not shown). The qubits are organized pairwise between each set of nodes. Thus, node 1 602 has a "column" of qubits that are entangled with node n 602", and node 1 602 has another "column" of qubits entangled with node 2 602', and so on for each node.

The use of quantum cache for addressing is described in connection with an Ethernet-like protocol. However, it should be understood that networks using entangled cache addressing according to the present teaching are not so limited. In the particular example described in connection with FIG. 6, node 1 602 wants to send a packet to node n 602". Node 1 602 broadcasts the packet, which contains an address field on the classical Ethernet channel 604. To determine the contents of the address field, Node 1 samples M qubits from the node n column in its cache and generates a resulting number that is random. Node n 602" has entangled pairs for each of these M qubits in its cache. Node 1 602 sends the results of the sampling on the classical Ethernet. Node n 602" samples the entangled pairs from its cache and generates a resulting random number, which will match the random address field from Node 1. Node n 602" matches the random number received on the classical channel to know that the packet is intended for node n.

All other nodes, such as node 2 602', also sample their qubit cache for M qubits in the column for node 1 602 to see if the packet is addressed to them. Node 2 602' does not get a match on the random number provided by node 1 602 and received via the classical channel. As such, the measured random number represents a quantum source-destination pair address. The probability of a match being a false match is 1/E, where E is an error rate described further below.

FIG. 6B illustrates a table 650 showing a structure of an entangled qubit cache for a multi-node network of the present teaching. In table 650, N is the size of the address space which requires sqrt(N) bits, I=N+E, where 1/E is the acceptable error probability (rate) which requires sqrt(E) bits. The total qubits required=sqrt(I) for the total address space at a given error rate.

The operation of the entangled quantum caches in the nodes 602, 602', 602" described in connection with FIG. 6A-B is based on an addressing application, but numerous other applications can utilize the shared entanglement in a network configuration according to the present teaching. Additional application examples are provided herein.

Figure 7:
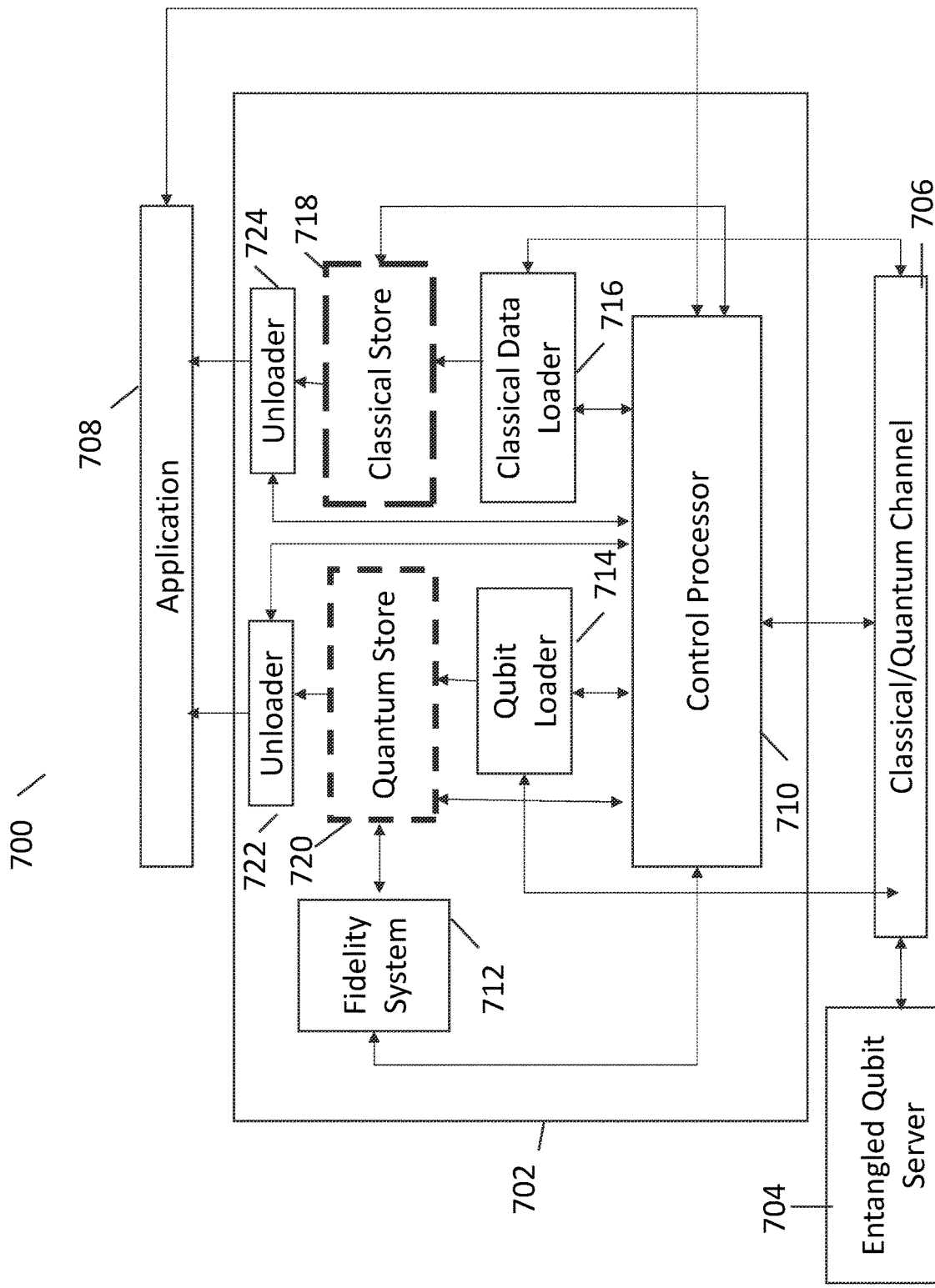
FIG. 7 illustrates a block diagram of an embodiment of a quantum-enabled information system that uses an entangled quantum cache according to the present teaching.

FIG. 7 illustrates a block diagram of an embodiment of a quantum-enabled information system 700 that uses an entangled quantum cache 702 according to the present teaching. The quantum cache 702 is supplied entangled qubits from an entanglement server 704 via a quantum portion of a communication channel 706. The quantum cache 702 supplies ordered and tagged entangled qubits to an application 708. The quantum cache 702 can also supply associated classical information about the particular associated ordered tagged qubit to the application 708. The quantum cache 702 is controlled by a processor 710. The processor 710 controls a fidelity system 712, a qubit loader 714, and a classical data loader 716 in the quantum cache 702. The processor 710 also controls a classical store 718 and a quantum store 720 in the quantum cache 702. The processor 710 is in communication with the application 708, so that it can command the quantum unloader 722 and the classical unloader 724 to supply entangled qubits and associated classical data to the application 708 at a desired time. The desired time may be chosen to ensure that entangled qubits supplied at two different nodes share an entangle state, allowing two remote nodes to share correlated state information. The desired time can be on-demand. The desired time can be predetermined. The desired time can be based on a lifetime of a quantum state. The desired time can be based on a time when the quantum state was generated. The desired time can be based on an application demand. For example, an application in various embodiments can access a particular shared entangled state. Also, for example, an application in various embodiments can access a particular type of quantum state. Also, for example, an application in various embodiments can access a particular basis of a quantum state. Also, for example, an application in various embodiments can access a particular fidelity of a quantum state. Also, for example, in various embodiments, an application can access a quantum state based on at least one of an entanglement property, a basis of a quantum state, a fidelity of a quantum state, a time-of-arrival of a quantum state, a source of a quantum state, an age of a quantum state, a half-life of a quantum state, a birth time of a quantum state, a time-of-flight of a quantum state, and/or a type of a quantum state.

Figure 8:
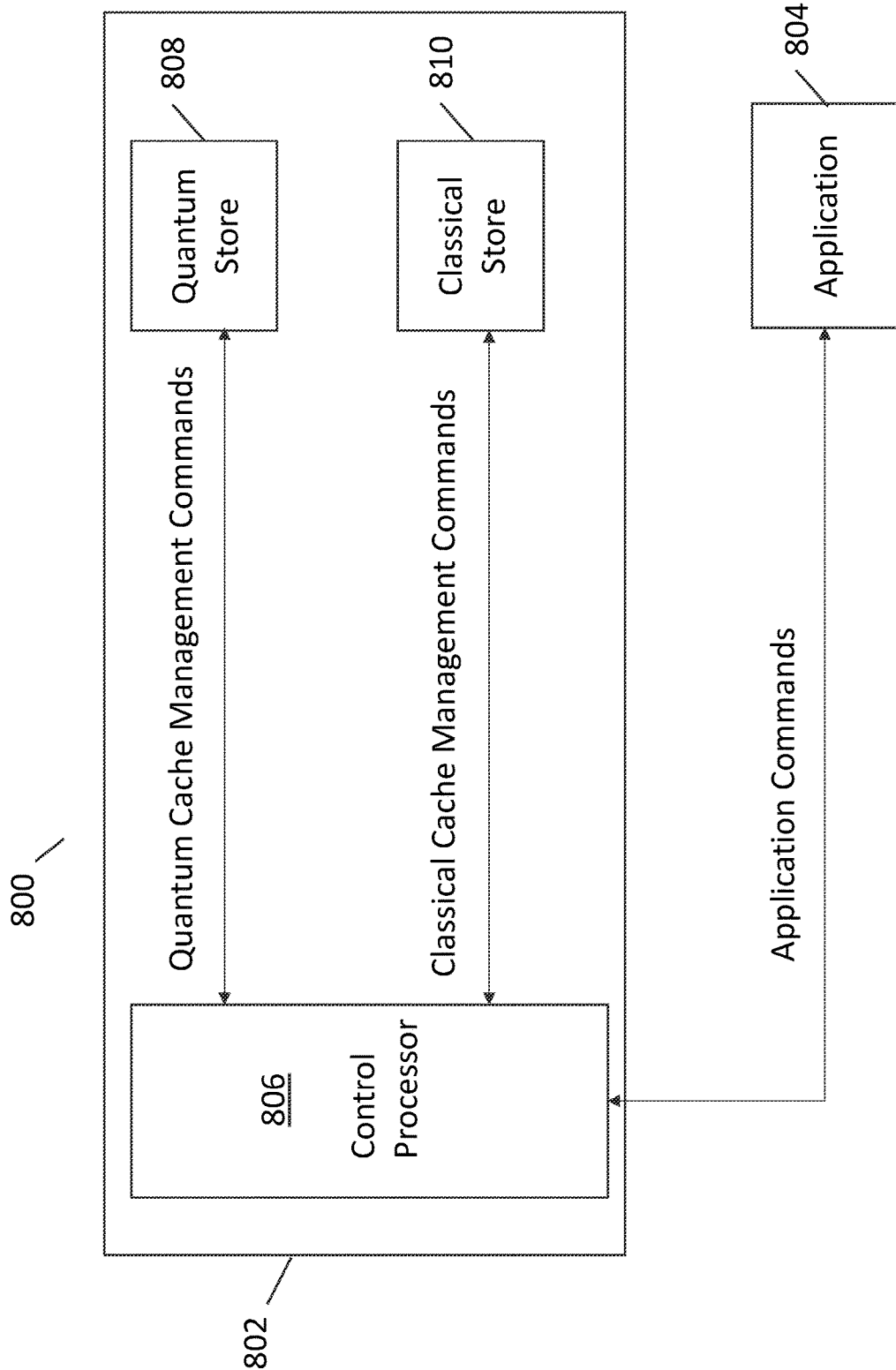
FIG. 8 illustrates a block diagram of an embodiment of a control system that controls an entangled quantum cache interacting with an application according to the present teaching.

FIG. 8 illustrates a block diagram of an embodiment of an application system 800 that utilizes an entangled quantum cache 802 interacting with an application 804 according to the present teaching. A processor 806 sends and receives application commands to an application 804. The processor 806 sends quantum cache management commands to a quantum store 808. The processor 806 also sends classical cache management commands to a classical store 804.

Some embodiments of the present teaching utilize an abstraction layer that supports an easy to use an interface for application coders. This is referred to as a classical application interface (CAPI). The abstraction layer translates between a CAPI and a quantum system. The abstraction layer uses, interprets, and/or generates at least some of the classical data associated with a quantum state.

The quantum mechanical nature of quantum devices adds another level of complexity to the underlying behavior of the devices that provide useful quantum functionality for information system engineering. Most engineers and scientists are trained in basic programming of causal Newtonian systems. For reference, there are about 1600 quantum physicists worldwide, yet there are upwards of 20 million software professionals worldwide. For quantum mechanical systems to be widely adopted, they must be easily used by classically trained software professionals. A classical application interface translates between these worlds. The advantage of the CAPI is to allow any coder to apply a quantum system as a black box. It is not necessary for the coder to know how quantum systems work, only how the quantum systems perform. The CAPI appears to a software developer as a familiar function structure in their chosen programming language. The following are some examples to illustrate a CAPI and how it works in an entangled quantum cache that is interfaced to an application. These examples are illustrative and not comprehensive.

A cache_pointer identifies a particular quantum cache 808, allowing for multiple caches in a single node. Only one node is shown in FIG. 8, but it is understood that the present teaching applies to any number of nodes. A qubit_pointer identifies a particular qubit in a cache and its associated metadata. A node identifies a particular node. A channel (not shown) allows for multiple connections from a single node.

Cache Management Functions include: 1) Integer=Get_Qubit_Count(cache_pointer), that indicates how many qubits are in cache; 2) Integer=Get_Long_Term_Qubit_count(cache_pointer), that indicates how many qubits are long term qubits; 3) Integer=Get_Short_Term_Qubit_count(cache_pointer) that indicates how many qubits are short term qubits; 4) Random_Integer=Sample_Qubit(cache_pointer,qubit_pointer), that indicates sample/collapse to classical; 5) Time=Get_Qubit_Age(cache_pointer,qubit_pointer), that indicates the age of the qubit; 6) Array(n)=Get_Qubit_Entanglement_Map(cache_pointer, qubit_pointer), that indicates what qubits are entangled; and 7) Local_cache_pointer=Put_Entangled_Qubit(cache_pointer, qubit_pointer,node), that put an entangled qubit over on another node. This function puts one member of an entangled pair at another node. It should be understood that the specific calls associated with the cache management functions are presented for illustrative purposes and not intended to limit the present teaching in any way.

In general, an application system 800 that utilizes an entangled quantum cache 802 interacting with an application 804 will include a processor 806 that is able to send and receive application commands to an application 804 that is easy to use for classically trained software engineers and software developers. The abstraction layer limits, for example, the amount of detailed information needed to control the quantum store 808 and classical store 810 that is passed to the application commands generated by the application 804 as illustrated in the example provided herein.

In one particular example, the application 804 is a quantum private address application that is described in more detail in connection with the description for FIG. 9. In these embodiments, the application commands include Secret_Address=Get_Address(node_X), that indicates what is the classical private address that looks random to other nodes.

In other specific embodiments, the application 804 is a super dense coding application that is described in more detail in connection with the description for FIGS. 10-12, below. In these embodiments, the application commands include: 1) Send(transmit_data,channel_number), that indicates send; 2) Receive_Data=received(channel_number, node), that indicates receive; 3) Integer=Get_Entangled_Count(node_address), that indicates check cache depth; 4) Allocate_Quantum_Channel (percent,channel_number), that allocates percent of channel for sending qubits.

An embodiment of a classical application interface for a super-dense coding application would include the following commands. For the transmitter: 1) Establish_Link(5,10), that commands entangled qubits to be shared between the transmitter and receiver; and 2) Send("Hello",5,10), that commands "Hello" to be sent. For the receiver the commands include: "Hello"=received(5,10), that indicates a "Hello" received. For the processor, the commands include: 1) 107=Get_Entangled_Count(10), that indicates we have only 107 entangled qubits left so need to allocate more of the channel to exchange entangled qubits; 2) Allocate_Quantum_Channel(50,10), that allocates 50% of the channel to build the entangled cache; 3) 1025=Get_Entangled_Count (10), that indicates that we now have 1025 qubits; and 4) Allocate_Quantum_Channel(5,10), that commands to reduce allocation to 5%.

One feature of the entangled quantum caches of the present teaching is that they can support a variety of classical, semi-classical, and pure quantum applications. Several example applications are provided below.

One application supported by the quantum entangled cache of the present teaching is providing shared-node metadata for distributed information systems. In this application, the qubits in the entangled qubit caches provide metadata for one or more of a variety of different classical distributed information systems. The shared-node metadata provided by the quantum entangled caches of the present teaching can support a variety of protocols that can provide, for example, addressing, timing, location and other information being shared between pairs and/or groups of nodes.

Figure 9:
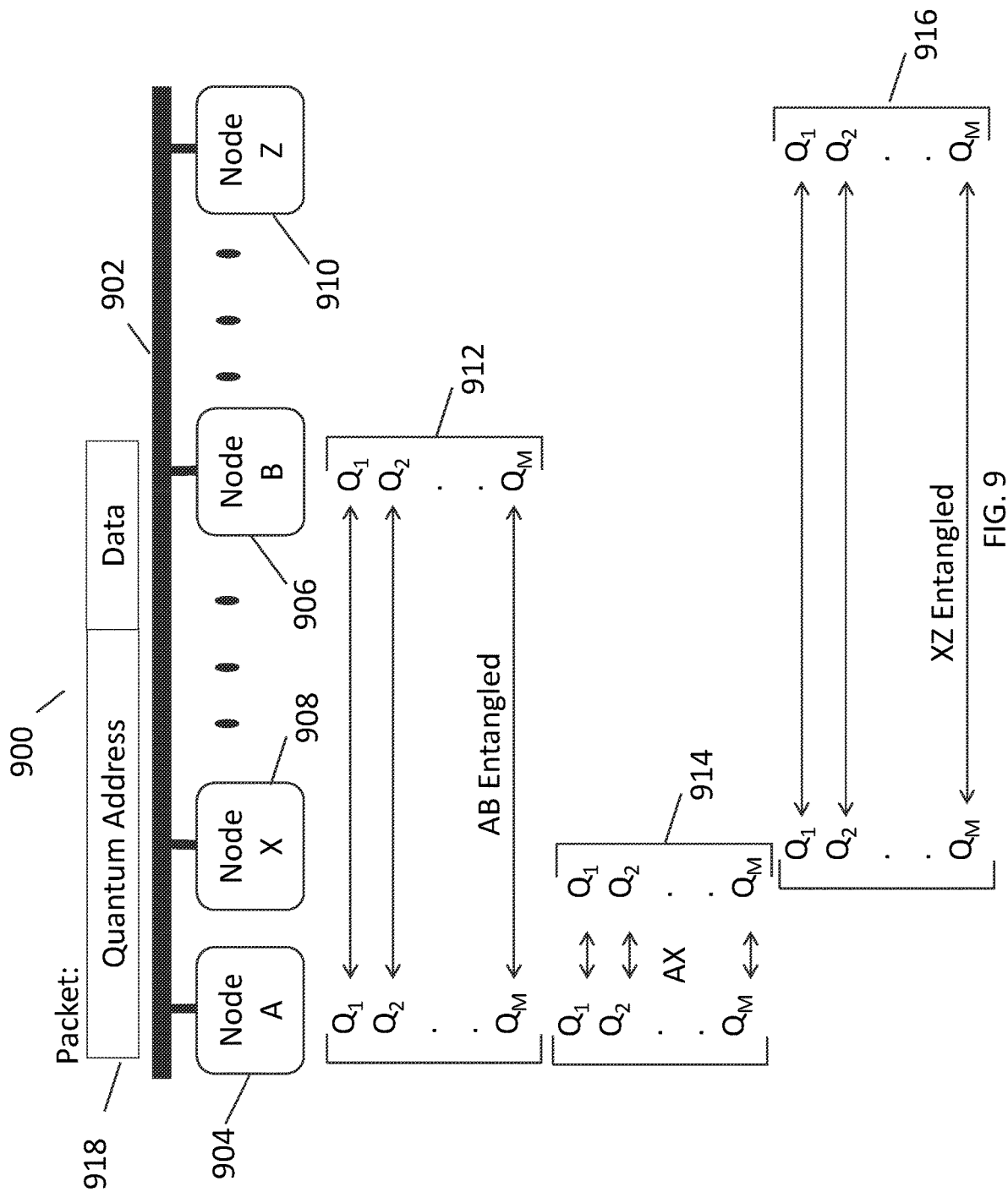
FIG. 9 illustrates an embodiment of a distributed system using an entangled cache to provide metadata according to the present teaching.

FIG. 9 illustrates an embodiment of a distributed system 900 using an entangled cache to provide shared-node metadata of the present teaching. A communication channel 902 connects a plurality of nodes 904, 906, 908, 910. The communication channel 902 supports both quantum communication and classical communication through any of a variety of means. In this embodiment, pairs of M entangled qubits are stored in caches in the various nodes. For example, as illustrated by the diagram 912, node A 904 and B 906 share M entangled qubits. As illustrated by the diagram 914, node A 904 and X 908 share M entangled qubits. As illustrated by the diagram 916, node X 908 and Z 910 share M entangled qubits. These various sets of M pairs of qubits are appropriately tagged and stored in a cache (not shown) in each node 904, 906, 908, 910, such that they can be accessed by processors in the nodes 904, 906, 908, 910 for processing and/or measurement to implement a desired protocol. The various M entangled qubits may be distributed by an entanglement server (not shown) over the communication channel 902, or by different means. Some protocols will exchange raw or processed qubits from the cache over a communication channel 902, but other protocols will not require any exchange of qubits to function.

A packet 918 includes a quantum address and data. The quantum address is, in some embodiments, a random number that is generated by a sender node, and received by a potential receiver node. The random number represents a quantum source-destination pair address. A receiver node measures qubits entangled with particular nodes to generate a random number representing source-destination address pairs for those particular nodes. For example, qubits entangled with node A are measured by a node to determine if a received packet is from node A. If a random number in the quantum address of a packet 918 is a match with a random number generated by a measurement of entangled qubits in a particular receiving node, then the data in the packet is for that receiving node.

An example of a metadata exchange between node A 904 and node B 906 is follows. Node A 904 measures each of M qubits known to be entangled with node B and generates a random number that represents an address. This random number is sent classically in the quantum address field of a packet 918 along with some data. Node B 906 measures each of M qubits known to be entangled with node A 904 to generate a random number. Node B 906 receives the packet 918, and compares the received random number with the generated random number. If there is a match, the data is for node B 906 from node A 904.

Another feature of the present teaching is that the quantum metadata produced with methods and apparatus according to the present teaching can be used to prevent anyone from knowing which source-destination pair of nodes is addressed with a quantum key distribution level of assurance. This is because the quantum entangled caches enable two or more nodes to share a random number "secret" without any exchange of classical data.

In general, such a feature can be applied to any of a variety addressing schemes. For example, addresses can be one or more of network addresses, memory locations, data base indexes, geographical addresses, telephone numbers, and many other identifiers. Any entity that desires to place data at, or communicate with, any other entity possesses a number, n, entangled qubits with associated other-paired entangled qubits that are possessed by the other entity. The number n is typically chosen such that it is large enough to minimize address collisions.

One example addressing scheme according to the present teaching is the application of the quantum metadata to a quantum Ethernet (broadcast channel) where the addresses are entangled qubits as described in connection with FIG. 9. In this addressing scheme, if node A 904 has a packet for node B 906, node 904 encodes using N-qubits in superposition that are ordered and entangled with qubits in node B 906. The packet includes a quantum address from node A 904 and data. Everyone receives the packet. Until measurement, none of the nodes 904, 906, 908, 910 know their particular address. When nodes make a measurement, they generate a random number. Then, node A 904 sends the random number via classical broadcast to all the nodes 906, 908, 910. If the random number agrees with a random number generated in a node when a measurement is made, the packet is for that node. Thus, the random number represents a quantum source-destination pair address.

A feature of this method is that an eavesdropper cannot determine which node the data was directed to nor can the eavesdropper determine the node that transmitted the data. The random number broadcast classically doesn't reveal anything except to the source and destination pair sharing the data. If the quantum entangled pairs are manipulated by a $3^{rd}$ party, which is measured and/or spoofed, these measurements and/or spoofing actions are detectable using a quantum key distribution protocol between the entanglement server and the caches. Said another way, if someone tried to determine the source destination pair, or spoof the source and/or the destination, that action would destroy the correlation of the random number. This feature makes the addressing scheme absolutely private to spoofing, which is highly desirable for many applications.

As another example of address according to the present teaching, consider a simple three node network that includes a transmitter and two receivers. For example, this three node network includes nodes A 904, B 906, and node X 908 of FIG. 9. Rather than being deterministic as in prior art classical addressing schemes, addressing schemes according to the present teaching are similar to hash collisions. However, a node can make the probability that data is sent to the wrong entity very small if the number of qubits, M, in a cache is much bigger than the address space. For the three-node network, with only one entangled qubit per node, the qubit could end up to be measured as a zero or a one with 50% probability. With five qubits to handle two addresses, the chances that all three nodes would get the same random number are very small, $(1/2)^5$. To get an address error rate of say $(1/10)^7$ then 20+n qubits are needed, where n represents the address space being covered. Using twenty-one qubits results in an error rate of $(2,000,000)^{-1}$, and twenty-two qubits results in an error rate of $(4,000,000)^{-1}$, and so on. As such, the number of qubits used per address can be notably larger than a number of classical address bits.

Generally, the quantum entangled cache system and method of the present teaching allows nodes to share entangled qubits amongst any other node to which they need to communicate. In various embodiments, the data is broadcast classically, or may also be sent on a quantum channel. As described above, the entanglement can be N-way entanglement and feed N-caches with M qubits directly from a single server. The entanglement of the M qubits can include K dimensions. Data may be protected using quantum key exchange and/or encrypted by known classical means. The address information is provided by measuring selected qubits in the quantum entangled caches. A sender makes a measurement and generates a random number, this number is broadcast with the data. A receiver also makes measurement of selected qubits to generate a random number and compares that number to those received in the addresses of packets on the network. When the two random numbers match, it can be concluded that the data was for that node.

In a network with n nodes participating in such a scheme, every node needs to have paired ensembles of entangled qubits with every other node. Every transmitter selects one of those paired ensembles to address a desired node for communication. In some embodiments, each node needs $2^{(n-1)}$ pairs of entangled ensembles in order to be able to address every other node in network with n nodes. The receiver needs to measure each of these paired ensembles to do the matching with the transmitter's address that's sent classically. And each ensemble needs to have at least n qubits.

In some embodiments, receivers can do measurements one bit at a time. So, for example, the first bit broadcast is compared to the first qubit in every ensemble. Statistically, this should eliminate $1/2$ the potential senders. Then the second qubit, eliminating the next $1/4$, and so on. In this way, the receiver only needs to do $n+(n-1)+(n-2)+ \ldots =2n(n-1)$ comparisons. The likelihood that a receiver misidentifies a message not intended for the receiver is $1/2^n$. As the address space increases, the probability of misidentified messaged decreases. Error rates in addressing can be further reduced by increasing the address space, that is making a more-sparse address space. For example, using an address space say $2^n$ for $2^m$ nodes, where n>m, every extra bit of addressing reduces the error rate by $1/2$.

One feature of the present teaching is that the receiver actually obtains two pieces of information by executing the protocol. First, the receiver knows that the message was intended for that particular receive. Second, the receiver knows the address of the source of the information.

Some systems according to the present teaching can be used for network initialization in the following way. The scheme is used to develop a set of classical addresses, which are the broadcast results of the measurement. These classical addresses appear to be random numbers to everyone except the intended receiver. So the transmitter sends a classical packet with an address header that is truly a random number determined by this scheme. The receiver learns to use classic logic to look for that number, which is actually the equivalent of a source and destination address, but looks random to everyone else.

Another feature of the present teaching is that it is possible to trade security for addressing overhead. In some embodiments of the present teaching, nodes decide how often to refresh the address (reinitialize) based on security needs. To be very secure, the address is refreshed for every packet. Less secure implementations only do refreshing at chosen intervals, much like updating a password.

Also, some systems according to the present teaching use addressing system that uses a quantum entangled cache described herein that provides privacy by starting with a shared secret. Every node pair, also referred to as a source-destination pair, shares a secret at initialization. That secret is an M-bit number, where M-bits is the size of the address space. It is important to note that this is for pairs of nodes, not singular nodes. The M-bit number must exist for every pair that wants to have a private source destination address. Referring again to the distributed system 900 using an entangled cache of FIG. 9, when node A 904 wants to talk with node B 906, node A 904 measures M qubits that are entangled with M qubits in node B's 906 cache. Node B 906 also measures M qubits that are entangled with M qubits in node A 904.

Then node A 904 does a bit-by-bit classical exclusive (XOR) of the value of the measured qubits with the shared secret, and sends the result of the XOR-ed sample classically over the channel 902 to node B 906. Only node B 906 has the shared pairwise secret. Node B 906 does the same XOR operation on the value of the measured qubits, therefore it's looking for the same number which still appears to be random. The other nodes, such as node X 908, for example, doesn't have the pair-wise secret, so cannot do anything with the quantum address. If node X 908 or other node somehow was able to capture the entangled bits destined for node B 906, they are not able to fake the identity of node A 904, because they lack the shared secret to perform the XOR.

In some methods according to the present teaching, the key is refreshed to prevent having a static key (or secret) using quantum secret tumbling in the following way. At any time, a node pair (node A 904 and node B 906, for example) can go into their respective entangled caches and sample (i.e. perform a measurement on M qubits in the cache) again. In some embodiments, this process occurs after every message. That measurement result (sample) can be XORed with the original secret. The result can become the new, or tumbled, secret that can be used for subsequent messages. This new, or tumbled, secret can also be referred to as a quantum signature and is one aspect of the present teaching.

Another application of quantum entangled cache systems according to the present teaching is the implementation of quantum super dense coding. Super dense coding is a powerful quantum communication scheme that allows a factor of two increase in the transmission capacity compared with a classical communication channel. This is because two classical bits of information can be sent using one qubit. Quantum caches according to the present teaching serve as a local resource for implementing the super dense coding protocol.

Figure 10:
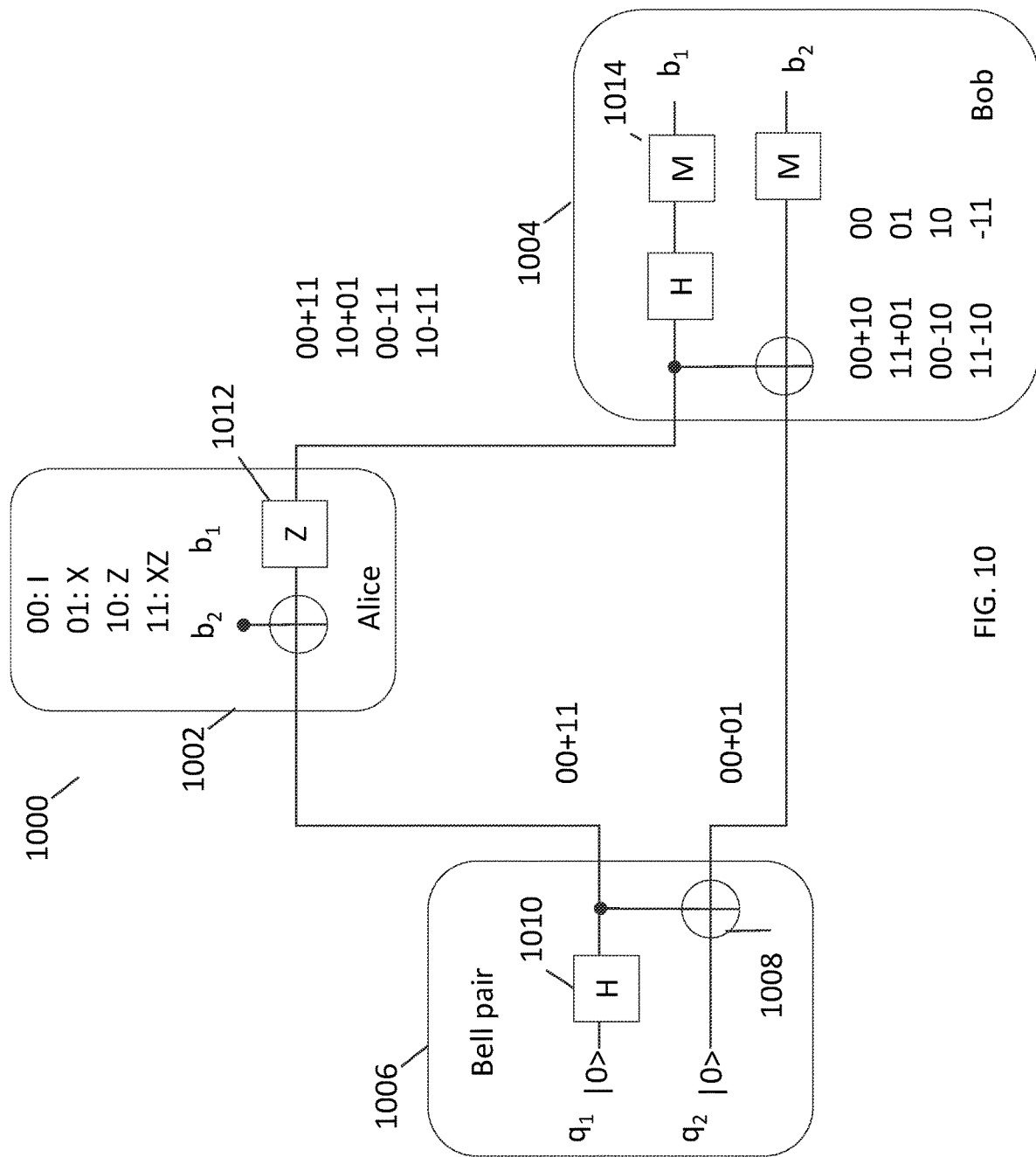
FIG. 10 illustrates a known quantum super dense coding scheme application operating between a transmitter and receiver.

FIG. 10 illustrates a known quantum super dense coding scheme application 1000 operating between a transmitter 1002 and a receiver 1004. Two classical bits of information are sent by a transmitter 1002, which we refer to for simplicity as Alice, to a receiver 1004, which we refer to for simplicity as Bob. These information bits, 00, 01, 10, 11, are coded on one of a pair of entangled qubits that is prepared in a Bell state by a qubit source 1006. One entangled qubit is provided by the source 1006 to the transmitter 1002, and is modulated with one of the four classical information bits and then sent to the receiver 1004. The other entangled qubit, which is not modulated, is provided to the receiver 1004 by the source. By processing the modulated qubit and the other entangled qubit, the receiver 1004 is able to determine which of the four information bits was sent by the transmitter 1002. The source 1006, transmitter 1002 and receiver 1004 use operators such as quantum CNOT 1008, Hadamard 1010 and/or Pauli-Z/or Pauli-X/or Pauli-X and Pauli-Z 1012. The receiver 1004 uses a measurement 1014 on both the modulated qubit from the transmitter 1002, and the other qubit of the entangled pair provided by the source 1006 to decode the classical information.

Figure 11:
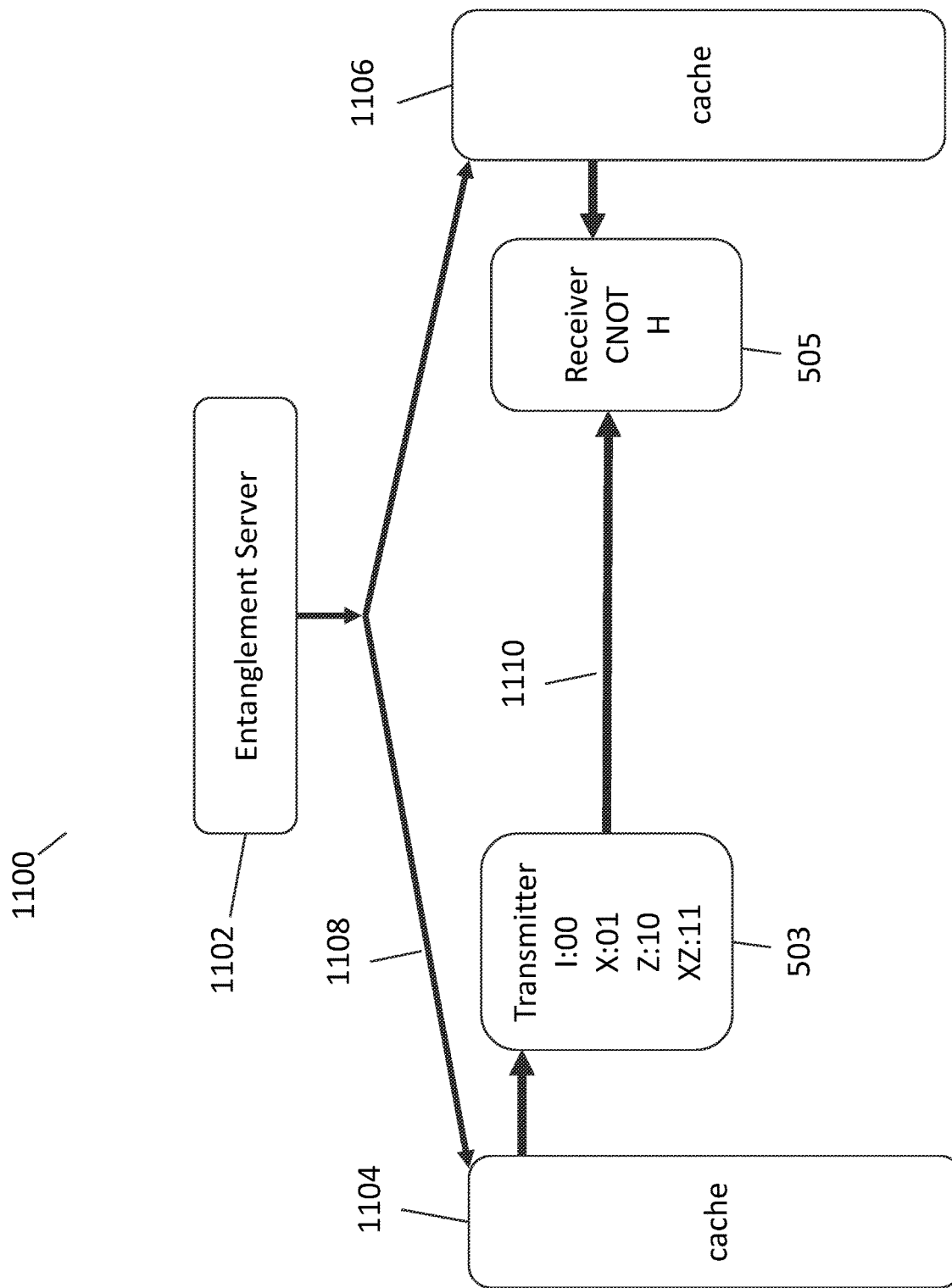
FIG. 11 illustrates an embodiment of a super-dense coding system using an entangled cache according to the present teaching.

FIG. 11 illustrates an embodiment of a super-dense coding system 1100 using an entangled cache according to the present teaching. The transmitter 503 and receiver 505 can operate as described above in connection with FIG. 5. A cache 1104 is connected to the transmitter 503, and another cache 1106 is connected to the receiver 505. The caches 1104, 1106 are connected to an entanglement server 1102. In some embodiments, this connection is provided by a quantum link 1108, but it should be understood that numerous other connection means can also be used. The caches 1104, 1106 are supplied entangled qubit pairs by an entanglement server 1102. The entanglement server fills the caches 1104, 1106 with entangled qubits. The caches 1104, 1106 tag the appropriate associated classical information to each qubit as well as maintaining the qubit in an entangled state as described herein. In this way, the transmitter cache 1104 and the receiver cache 1106 are populated.

Each information bit modulated by the transmitter 503 comprises a qubit pulled from the cache. Each information bit decoded in the receiver 505 utilizes a received modulated qubit sent over a quantum channel 1110 from the transmitter that is processed as described in connection with FIG. 5 using a qubit that is pulled from the cache 1106. The receiver uses the classical information that is tagged to each qubit in the cache 1106 to determine which qubit to pull and process with the modulated qubit.

In some embodiments, the transmitter 503 applies operators to qubits in order and sends them to the receiver 505 over a quantum channel 1110. These operators are I: 00, X: 01, Z: 10 and XZ: 11. The receiver 505 performs CNOT operations on the cached qubits from the cache 1106 in order with received qubits from the transmitter 503. This operation is followed by a Hadamard transform operator which performs a measurement to decode the classical information bit modulated by the transmitter 503. Two bits of classical information are provided over the link 1110 using only one qubit resource.

Figure 12:
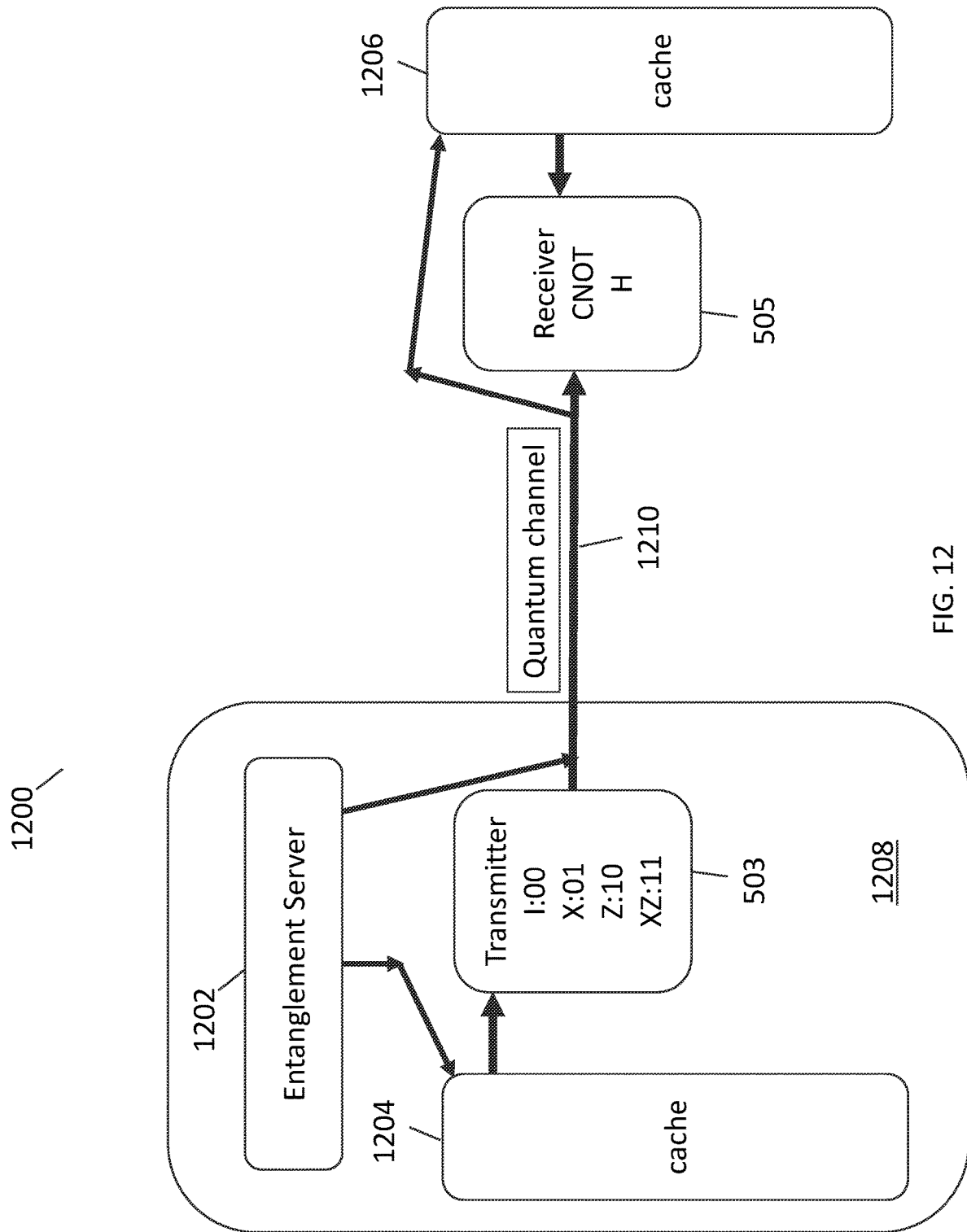
FIG. 12 illustrates another embodiment of a super-dense coding system using an entangled cache according to the present teaching.

FIG. 12 illustrates another embodiment of a super-dense coding system 1200 using an entangled cache according to the present teaching. Like the super-dense coding system 1100 described in connection with FIG. 11, the transmitter 503 and receiver 505 operate as described above in connection with FIG. 5. In this embodiment, an entanglement server 1202 is connected to a transmitter cache 1204 and to a receiver cache 1206 but with a different architecture than the super-dense coding system 1100 described in connection with FIG. 6. The caches 1204, 1206 are supplied entangled qubit pairs by entanglement server 1202 and qubits are tagged to build the caches 1204, 1206. The entanglement server 1202 is co-located in one area 1208 with the transmit cache 1204 and the transmitter 503. A quantum channel 710 connects the transmitting area 708 to the receiver 505. The entanglement server 1202 supplies entangled qubits to the receiver cache 706 using the quantum channel 710.

Each information bit modulated by the transmitter 503 includes a qubit pulled from the cache. Each information bit decoded in the receiver 505 utilizes a received modulated qubit sent over a quantum channel 1210 from the transmitter that is processed as described in connection with FIG. 5 using a qubit that is pulled from the cache 1206. The receiver 505 uses the classical information that is tagged to each qubit in the cache 1206 to determine which qubit to pull and process with the modulated qubit. The transmitter 503 applies operators to modulate the qubits from the cache 1204 in order and then sends them to the receiver 505 over a quantum channel 610. The receiver 505 performs CNOT operations on the cached qubits from cache 706 in order with received qubits from the transmitter 503. The receiver 505 then performs a Hadamard operation and performs a measurement to decode the classical information bit modulated by the transmitter 503. The result is that two bits of classical information are provided over the link 1210 using only one qubit resource.

In some embodiments, the entanglement server 1202 uses quiet channel intervals to fill the remote cache 1206 at the receiver 505 with entangled qubits. In some embodiments, the transmitter 503 is sending entangled qubits in advance of knowing what data is desired to be transmit. The transmitter 503 decides what is desired to be sent, and only sends one qubit for every 2 bits of classical data. The other classical "bit" is derived by the receiver 505 using a combination of the transmitted qubit and the entangled qubit that may be sent way in advance. The result is communication with non-causal-like behavior.

It should be understood that the super dense coding systems with entangled caches described in connection with FIGS. 11-12 are just some specific examples of the systems and methods of the present teaching. Numerous other architectures can be implanted with the teachings described herein. In various embodiments, various elements of the coding systems 1100, 1200 may be remotely located or co-located. The distance between elements also varies with the specific implementation. For example, in numerous embodiments of systems according to the present teaching, all or some of the elements can be located on a same backplane, card, box, rack, or room. Also, in numerous embodiments of systems according to the present teaching, all or some of the elements can be located across a variety of geographical regions from close to far distances, including both terrestrial and space-based locations. Connection channels can be implemented in a variety of photonic and/or electronic means, including wireless and wired channels.

While the examples of quantum entangled caches described herein are highly simplified, the caches can include qubits from numerous entanglement servers that can be used for various different purposes in support of different services and processing applications. For example, one or more caches can store one or more types of qubits, including different types of physical qubits, with different entanglement conditions and entanglement partners. Also, for example, the caches can provide an application access to a particular quantum state at a particular time. Also, for example, the caches can provide an application access to a quantum state based on particular classical data associated with that quantum state and/or at a particular time. Caches can be architected in various configurations, such as FIFO, LIFO, random access, and combinations of these and other storage architectures.

EQUIVALENTS

While the Applicant's teaching is described in conjunction with various embodiments, it is not intended that the Applicant's teaching be limited to such embodiments. On the contrary, the Applicant's teaching encompasses various alternatives, modifications, and equivalents, as will be appreciated by those of skill in the art, which may be made therein without departing from the spirit and scope of the teaching.

What is claimed is:

1. A quantum cache comprising:
   a) a quantum store having an input that receives a plurality of quantum states having fundamental quantum properties comprising superposition, the quantum store configured to store and order the plurality of quantum states and to provide select ones of the stored and ordered plurality of quantum states to a quantum data output at a first desired time;
   b) a fidelity system having an input that is coupled to the quantum store, the fidelity system configured to determine fidelity information associated with a coherence property of at least some of the plurality of quantum states and further configured to discard at least some quantum states based on the coherence property;
   c) a classical store coupled to the fidelity system, the classical store configured to store classical data comprising the determined fidelity information and an index that associates particular ones of classical data with particular ones of the plurality of quantum states and to supply at least some of the classical data to a classical data output at a second desired time; and
   d) a processor connected to the classical store, the processor determining the first desired time based on the index.

2. The quantum cache of claim 1 wherein the quantum store is further configured to perform last-in-first-out (LIFO) quantum state ordering.

3. The quantum cache of claim 1 wherein the quantum store is further configured to provide random access to at least some of the ordered plurality of quantum states to the quantum data output at the first desired time.

4. The quantum cache of claim 1 further comprising a quantum state loader that provides the plurality of quantum states to the quantum store.

5. The quantum cache of claim 1 further comprising a quantum state unloader that provides the order plurality of quantum states to the quantum data output at the first desired time.

6. The quantum cache of claim 1 wherein the fidelity system comprises an age out timer.

7. The quantum cache of claim 1 wherein the fidelity system is further configured to remove quantum states based on a value of an entanglement property.

8. The quantum cache of claim 1 wherein the fidelity system is further configured to determine the fidelity of the at least some of the ordered plurality of quantum states in a probabilistic way.

9. The quantum cache of claim 1 wherein the classical store is configured to store classical data comprising at least one of a time of at least some of the plurality of quantum states, a determined fidelity of at least some of the plurality of quantum states, and a position of at least some of the plurality of quantum states in the ordered plurality of quantum states.

10. The quantum cache of claim 1 wherein the stored classical data comprises an entanglement map of quantum states in the quantum store.

11. The quantum cache of claim 1 wherein the processor is further configured to determine the index.

12. The quantum cache of claim 1 wherein the processor is further configured to determine the first desired time based on the particular ones of classical data associated with the index.

13. The quantum cache of claim 12 wherein the particular ones of classical data associated with the index comprise at least one of an entanglement property, a basis of a quantum state, a fidelity of a quantum state, a time-of-arrival of a quantum state, a source of a quantum state, an age of a quantum state, a half-life of a quantum state, a birth time of a quantum state, a time-of-flight of a quantum state, or a type of a quantum state.

14. The quantum cache of claim 1 wherein the fidelity system is further configured to discard quantum states that have collapsed into classical states.

15. The quantum cache of claim 1 wherein the fidelity system is further configured to determine fidelity information of at least some of the plurality of quantum states in a deterministic way.

16. The quantum cache of claim 1 wherein the fidelity system is further configured to determine fidelity information of at least some of the plurality of quantum states based on ensembles of quantum states.

17. The quantum cache of claim 1 wherein the fidelity system is further configured to determine fidelity information of at least some of the plurality of quantum states based on a predetermined half-life of the ordered quantum state.

18. The quantum cache of claim 1 wherein the fidelity system is further configured to perform quantum purification.

19. The quantum cache of claim 1 wherein the fidelity system further comprises a quantum coherence engine that is configured to determine a fidelity of at least some of the plurality of quantum states.

20. The quantum cache of claim 1 wherein the quantum store is configured to maintain fidelity of quantum states to a predetermined level.

21. The quantum cache of claim 1 wherein the quantum store comprises an atomic memory.

22. The quantum cache of claim 1 wherein the quantum store comprises an electromagnetically-induced-transparency atomic quantum memory.

23. The quantum cache of claim 1 wherein the quantum store comprises a fiber buffer.

24. The quantum cache of claim 1 wherein the quantum store comprises hierarchical fiber loops that provide the ordering of the plurality of quantum states.

25. The quantum cache of claim 1 wherein the quantum store is further configured to interleave the plurality of quantum states.

26. The quantum cache of claim 1 wherein the quantum store is further configured to perform first-in-first-out (FIFO) quantum state ordering.

27. The quantum cache of claim 1 wherein at least one of the plurality of quantum states comprises a qubit.

28. The quantum cache of claim 27 wherein the qubit comprises a photonic qubit.

29. The quantum cache of claim 27 wherein the qubit comprises an atomic qubit.

30. The quantum cache of claim 1 wherein at least one of the plurality of quantum states comprises an entangled photon.

31. The quantum cache of claim 1 wherein at least one of the plurality of quantum states comprises an entangled atomic spin.

32. The quantum cache of claim 1 wherein at least one of the plurality of quantum states comprises a quantum state of an ensemble of quantum physical systems.

33. The quantum cache of claim 1 wherein the quantum store comprises a multilayer quantum store.

34. The quantum cache of claim 33 wherein the multilayer quantum store comprises at least one fiber optic loop buffer storage system.

35. The quantum cache of claim 33 wherein the multilayer quantum store comprises at least one atomic qubit storage system.

36. A method of storing quantum states, the method comprising:
  a) ordering a plurality of quantum states having fundamental quantum properties comprising superposition;
  b) storing the ordered plurality of quantum states;
  c) providing select ones of the ordered plurality of quantum states at a first desired time;
  d) determining fidelity information associated with a coherence property of at least some of the plurality of ordered quantum states;
  e) discarding at least some quantum states based on the coherence property;
  f) storing classical data comprising the determined fidelity information and an index that associates particular ones of classical data with particular ones of the plurality of quantum states;
  g) providing the classical data at a second desired time; and
  h) determining the first desired time based on the index.

37. The method of claim 36 wherein the determining the first desired time based on the index comprises determining the first desired time based on the particular ones of classical data associated with the index.

38. The method of claim 36 wherein the particular ones of classical data associated with the index comprise at least one of an entanglement property, a basis of a quantum state, a fidelity of a quantum state, a time-of-arrival of a quantum state, a source of a quantum state, an age of a quantum state, a half-life of a quantum state, a birth time of a quantum state, a time-of-flight of a quantum state, or a type of a quantum state.

39. The method of claim 36 further comprising maintain entanglement of the quantum states to a predetermined level until the select ones of the ordered plurality of quantum states are provided at a first desired time.

40. The method of claim 36 further comprising interleaving the plurality of quantum states.

41. The method of claim 36 wherein the ordering of the plurality of quantum states is first-in-first-out (FIFO) ordering.

42. The method of claim 36 wherein the determining fidelity information associated with the coherence property comprises determining the fidelity information in a deterministic way.

43. The method of claim 36 wherein the determining fidelity information associated with the coherence property comprises determining the fidelity information in a probabilistic way.

44. The method of claim 36 wherein the determining fidelity information associated with the coherence property comprises determining the fidelity information based on ensembles of quantum states.

* * * * *